(12) United States Patent
Martin et al.

(10) Patent No.: US 12,428,551 B2
(45) Date of Patent: Sep. 30, 2025

(54) CHEMICALLY COMPATIBILIZED FLUOROPOLYMER BLENDS

(71) Applicants: DAIKIN AMERICA, INC., Orangeburg, NY (US); DAIKIN INDUSTRIES, LTD., Osaka (JP)

(72) Inventors: Arthur W. Martin, Decatur, AL (US); Dakarai Kameron Brown, Hopkins, MN (US); Kyle R. Ptak, Decatur, AL (US); Halie Jill Martin, Decatur, AL (US)

(73) Assignees: DAIKIN AMERICA, INC., Orangeburg, NY (US); DAIKIN INDUSTRIES, LTD., Osaka (JP)

( * ) Notice: Subject to any disclaimer, the term of this patent is extended or adjusted under 35 U.S.C. 154(b) by 767 days.

(21) Appl. No.: 17/668,048

(22) Filed: Feb. 9, 2022

(65) Prior Publication Data

US 2022/0267582 A1    Aug. 25, 2022

Related U.S. Application Data

(63) Continuation of application No. PCT/JP2020/032691, filed on Aug. 28, 2020.
(Continued)

(51) Int. Cl.
*C08L 27/18*    (2006.01)

(52) U.S. Cl.
CPC ......... *C08L 27/18* (2013.01); *C08L 2205/025* (2013.01); *C08L 2205/035* (2013.01)

(58) Field of Classification Search
CPC ............... C08L 27/18; C08L 2205/025; C08L 2205/035; C08L 2205/02; C08L 2205/03;
(Continued)

(56) References Cited

U.S. PATENT DOCUMENTS

| 8,460,795 B2 | 6/2013 | Anderson et al. |
| 2001/0006727 A1 | 7/2001 | Lee et al. |

(Continued)

FOREIGN PATENT DOCUMENTS

| CN | 104530719 A | 4/2015 |
| CN | 105838160 A | 8/2016 |

(Continued)

OTHER PUBLICATIONS

International Preliminary Report on Patentability with Written Opinion dated Mar. 1, 2022 in counterpart International Application No. PCT/JP2020/032691.
(Continued)

*Primary Examiner* — Robert S Jones, Jr.
*Assistant Examiner* — Joshua Caleb Bledsoe
(74) *Attorney, Agent, or Firm* — Sughrue Mion, PLLC

(57) ABSTRACT

A polymer alloy composition including: (a) a fluoropolymer selected from fluorinated ethylene propylene (FEP), perfluoroalkoxy alkane (PFA), ethylene tetra-fluoroethylene (ETFE), and a terpolymer of ethylene, tetrafluoroethylene, and hexafluoropropylene (EFEP); (b) a compatibilizing agent; and (c) a polyether imide (PEI) or polyimide (PI). Also disclosed is a method of forming a thermoplastic alloy. The polymer alloy may be used to form various extruded workpieces including, for example, a bag, film, container, filament, food package, coating (such as a coating or jacketing for a wire), powder for powder electrostatic powder coating, powder for dispersions, compression molded and various injection molded parts.

11 Claims, 23 Drawing Sheets

Related U.S. Application Data

(60) Provisional application No. 62/893,991, filed on Aug. 30, 2019.

(58) Field of Classification Search
CPC .......... C08L 79/08; C08L 27/12; C08L 27/22; C08K 2201/011; C08K 5/353; C08G 73/1039; C08G 73/1046; C08G 73/1071; C08G 73/1014
See application file for complete search history.

(56) References Cited

U.S. PATENT DOCUMENTS

| | | |
|---|---|---|
| 2003/0204021 A1 | 10/2003 | Lee et al. |
| 2005/0197460 A1* | 9/2005 | Patel ................ C08L 27/12 525/192 |
| 2007/0078209 A1 | 4/2007 | Jozokos et al. |
| 2007/0200274 A1 | 8/2007 | Lee et al. |
| 2014/0183420 A1 | 7/2014 | Kamoi et al. |
| 2017/0226389 A1 | 8/2017 | Wang et al. |
| 2018/0015647 A1 | 1/2018 | Kramb et al. |
| 2018/0371227 A1* | 12/2018 | Morken ................ C08K 5/0025 |
| 2021/0032453 A1 | 2/2021 | Martin et al. |
| 2023/0203292 A1 | 6/2023 | Martin et al. |
| 2023/0203375 A1 | 6/2023 | Martin et al. |

FOREIGN PATENT DOCUMENTS

| | | | |
|---|---|---|---|
| CN | 110511533 A | 11/2019 | |
| EP | 0 728 776 A1 | 8/1996 | |
| EP | 0 969 045 A1 | 1/2000 | |
| JP | 9-309961 A | 12/1997 | |
| JP | 2001-181463 A | 7/2001 | |
| JP | 2011-140536 A | 7/2011 | |
| WO | 94/14890 A1 | 7/1994 | |
| WO | WO-2017053880 A1 * | 3/2017 | ........... B32B 27/322 |
| WO | 2022/050378 A1 | 3/2022 | |
| WO | 2022/050379 A1 | 3/2022 | |

OTHER PUBLICATIONS

International Search Report with Written Opinion dated Jan. 11, 2022 in related International Application No. PCT/JP2021/032446 (published as WO 2022/050378).
International Search Report with Written Opinion dated Nov. 16, 2021 in related International Application No. PCT/JP2021/032454 (published as WO 2022/050379).
Office Action issued Jul. 2, 2024 in U.S. Appl. No. 18/177,828.
Extended European Search Report issued Aug. 14, 2024 in European Application No. 21864431.8.
Extended European Search Report issued Jun. 19, 2023 in European Application No. 20859029.9.
International Search Report for counterpart PCT/JP2020/032691 with translation of the Written Opinion dated Nov. 24, 2020 [PCT/ISA/210].
Extended European Search Report issued Sep. 5, 2024 in Application No. 21864430.0.
Office Action dated Jan. 28, 2025 issued in U.S. Appl. No. 18/177,828.

* cited by examiner

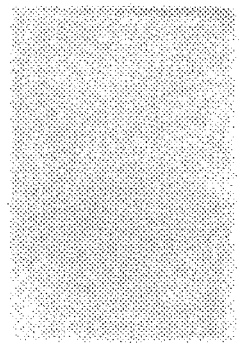
FIG. 2A
Fully fluorinated FEP
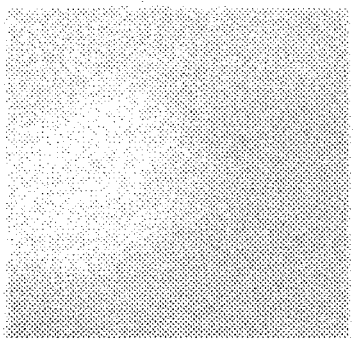
FIG. 2B
236B
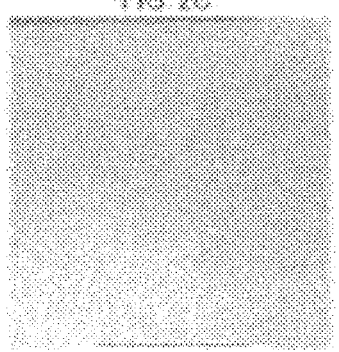
FIG. 2C
236C
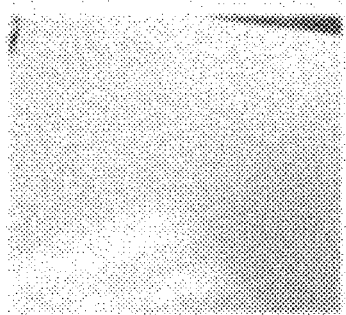
FIG. 2D
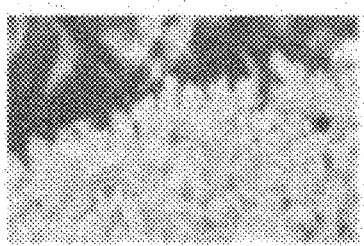
236E

FIG. 19

| | |
|---|---|
| ZrS-10 | zirconium (+4) salt of TBSA |
| CrS-10 | chromium (+3) salt of TBSA |
| CeS-10 | cerium (+4) salt of TBSA |
| KS-10 | potassium salt of TBSA |
| HS-10 | TBSA |
| AS-10 | aluminum salt of TBSA |
| SrS-10 | strontium salt of TBSA |
| CaS-10 | calcium salt of TBSA |
| ZnS-10 | zinc salt of TBSA |
| BaS-10 | barium salt of TBSA |
| LS-10 | lithium salt of TBSA |
| FS-10 | iron (+3) salt of TBSA |
| TEAS-10 | triethylamine salt of TBSA |
| BS-6A | barium p-(perfluoro[1,3-dimethylbutyl]) benzene sulfonate |
| BS-9A | barium p-(perfluoro[1,3,5-trimethylhexyl]) benzene sulfonate |
| BaS-A(II) | barium p-toluene sulfonate |
| BaP-A | barium benzene phosphonate |
| NaP-A | sodium benzene phosphonate |
| NaS-A(II) | 4,5-dihydroxy-m-benzene disulfonic acid disodium salt |
| NaS-6 | sodium perfluorohexane sulfonate |
| BS-6 | barium perfluorohexane sulfonate |
| BS-8 | barium perfluorooctane sulfonate |
| KS-6 | potassium perfluorohexane sulfonate |
| KS-8 | potassium perfluorooctane sulfonate |
| KS-8C | potassium perfluorocyclohexylethane sulfonate |
| NaS-1 | sodium trifluoromethane sulfonate |
| KS-1 | potassium trifluoromethane sulfonate |
| KS-1(II) | potassium methane sulfonate |
| BaS-3(II) | barium propane sulfonate |
| NaTCA | sodium trichloroacetate |
| BTBP | barium salt of F(CF$_2$)$_n$CH$_2$CH$_2$PO$_3$H wherein n is a mixture of 6, 8, 10 and possibly 12, predominantly 8 |
| NTBP | sodium salt of F(CF$_2$)$_n$CH$_2$CH$_2$PO$_3$H wherein n is a mixture of 6, 8, 10 and possibly 12, predominantly 8 |
| LL1121B | barium perfluoro(2,5-dimethyl)-3,6-dioxatridecanoate |
| BC14(OS) | barium perfluoro 3,5,7,9,11,13-hexaoxatetradecanoate |
| BS-12(II) | barium lauryl sulfate |
| NS-12(II) | sodium lauryl sulfate |
| CC-18(II) | calcium stearate |
| BaC-8 | barium perfluorooctanoate |
| BaC-9 | barium perfluorononanoate |
| AWG-26 | Solid copper wire 404 micrometers in diameter |
| AWG-24 | Solid copper wire 510 micrometers in diameter |
| AWG-22 | Solid copper wire 635 micrometers in diameter |

# CHEMICALLY COMPATIBILIZED FLUOROPOLYMER BLENDS

CROSS REFERENCE TO RELATED APPLICATIONS

This application is a Rule 53(b) Continuation of International Application No. PCT/JP2020/032691 filed Aug. 28, 2020, claiming priority based on U.S. Provisional Application No. 62/893,991 filed Aug. 30, 2019, the disclosures of which are incorporated herein by reference in their entirety.

BACKGROUND OF THE INVENTION

1. Technical Field

The present disclosure relates generally to polymer chemistry, and specifically to blends of functionalized fully fluorinated polymers with other polymers that are not fully fluorinated.

2. Background Art

Fluorine-containing polymers exhibit excellent heat resistance, flame retardancy, chemical resistance, weather resistance, high elongation, low friction, and low dielectric properties. However, fluoropolymers demonstrate poor compatibility with other polymer materials having no fluorine atoms. Due to poor compatibility, it is difficult to form satisfactory polymer alloys with fluoropolymers. This limits the versatility of fully fluorinated fluoropolymers as compared to other types of polymers. Although efforts have been made to synthesize partially fluorinated fluoropolymers with non-fluorinated polymers, these efforts have not resulted in a fully fluorinated fluoropolymer that is miscible with non-fluorinated polymers.

Typical uses for fluoropolymers include wire insulation for computer networks, semi-conductor manufacturing equipment, and automotive fuel hoses, automotive powertrain and under the hood electrical appliances. About 85 percent of fluoropolymers are used in industrial applications such as these. The other 15 percent are used in consumer products such as nonstick cookware, bakeware, small electronics, and weather- and chemical-protective fabrics. Because of their unique qualities (which include great strength, versatility, durability and heat resistance), fluoropolymers improve the performance and safety of computers, aircraft, and automobiles, reduce the risk of fire in high-rise buildings, and reduce air, water, industrial, and automotive pollution.

In the electronics industry, polymeric materials used to manufacture Printed Circuit Board (PCB) laminates can be ranked by the value of their dielectric constant $D_k$, and their dissipation factor $D_f$, with the top of the pyramid represented by the highest performance materials having the lowest dielectric constant and dissipation factor. A PCB can be rigid, flexible, or rigid-flexible, and contain 1 to 50 or more laminates, each made of thermoplastic or thermoset materials. The material used for a specific laminate in a PCB will depend on a variety of factors, such as cost, position in the PCB, and technical characteristics including mechanical, electrical, thermal and other properties.

Low dielectric constant ($D_k$) and low dissipation factor ($D_f$), which define a material as being "low loss," are critical properties for high speed digital/high frequency PCBs which are used in a variety of emerging markets such as Autonomous Driving and Fifth Generation Wireless Communication (5G). Applications include but are not limited to, automotive radars and electronic components found in 5G communication devices, such as radio frequency components, power amplifiers and antennas, especially operating in the so-called mmWave band. Low loss ($D_f$) thermoplastic laminates are used in high frequency PCBs to enable high-power applications and reduce the loss of energy generated by heat, which would degrade the quality of the signal. Low dielectric constant ($D_k$) laminates are particularly important in high speed digital PCBs by enabling rapid signal propagation.

Polytetrafluoroethylene (PTFE) is a thermoplastic material exhibiting some of the lowest dielectric properties, and is thus the preferred material for low loss PCB laminate. Its mechanical properties are however relatively weak compared to other specialty materials used in high performance PCB applications, such as Liquid Crystal Polymers (LCP) and Polyimide (PI). Furthermore, its low surface energy makes it difficult to bond other materials to it.

In the automotive industry, due to ever increasing network data traffic, modern computer systems have been continuously updated with higher processing speeds and bandwidth to keep pace. These increasing data demands are becoming ever more present in network systems used in motor vehicles. Historically, to transfer data in motor vehicle network systems, the industry has relied upon systems such as, Controller Area Network (CAN Bus). Systems such as CAN Bus, and the cables to support them, are too slow and cumbersome to handle the new high speed and broadband devices being placed in motor vehicles such as Lidar, Radar, advanced infotainment, and back up camera systems. A motor vehicle is quickly becoming a rolling network and as such, will need to be able to process increasing data throughput, with very high reliability and uptime, at ever increasing speeds (lower latency). To realize the next generation in motor vehicle control, autonomous driving, an advanced network operating system such as Ethernet, will need to be deployed. Ethernet is the universal operations protocol for network systems used in buildings. Ethernet is in the process of becoming the new network protocol for the motor vehicle industry. Once high speed Ethernet is installed in motor vehicles, they will be able to communicate with the new wireless networks, and seamless, reliable, low latency communication will be available for advanced applications such as autonomous driving.

The Institute of Electrical and Electronics Engineers (IEEE) 802.3 Ethernet Group and the Society of Automotive Engineers (SAE) have developed, or are in the process of developing standards for high speed, Ethernet motor vehicle networks (including the physical layer). According to these standards, automotive Ethernet networks will be interconnected with high performance, single pair, twisted pair cables. This is a departure from building systems which have historically used four pair, twisted pair cables. The automotive industry's need for reduced size and weight have driven developers to create these unique single pair designs. Ethernet technology has advanced to the point that ultimately multiple gigabits of data per second will be reliably transmitted over a single twist pair cable. Unfortunately, the materials used in previously known Ethernet cables are not capable of withstanding the environmental conditions within a motor vehicle while still allowing the Ethernet cable to provide sufficient data throughput so as to meet the data demands of modern and future motor vehicle computer systems.

Accordingly, there remains a need in the art for fluorine-containing polymer alloys having good mechanical properties that combine a fully fluorinated polymer and a non-fluorinated polymer and that may be used in, for example, new types of communications cables (such as Ethernet cables) and high speed/high frequency PCB laminates.

SUMMARY OF INVENTION

The present disclosure describes a blend of fluorinated and non-fluorinated polymers that addresses the problems described above by adding a functional end or pendant group to a fully fluorinated polymer that confers miscibility with non-fluorinated or partially fluorinated polymers (although it is to be understood that not every embodiment disclosed herein will address every problem described above).

Some disclosed embodiments relate to a polymer blend comprising: (a) a functionalized fully fluorinated fluoropolymer comprising a section that is fully fluorinated and a first functionalized end group; (b) a functionalized non-fully fluorinated polymer comprising a non-fully fluorinated section and a second functionalized end or pendant group capable of forming a chemical bond with the first functionalized end group.

Some disclosed embodiments relate to a polymer blend comprising: (a) a fully fluorinated fluoropolymer; (b) a functionalized fully fluorinated fluoropolymer comprising a section that is a truncated version of the fully fluorinated fluoropolymer and a first functionalized end group; (c) a non-fully fluorinated polymer; and (d) a functionalized non-fully fluorinated polymer comprising a section that is a truncated version of the non-fully fluorinated polymer and second functionalized end or pendant group, wherein the first functionalized end group and the second functionalized end or pendant group are capable of reacting to form a chemical bond.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

BRIEF DESCRIPTION OF THE DRAWINGS

FIGS. 2A, 2B, 2C and 2D are photographs showing pellets of a FEP control and an embodiment of the disclosed polymer blends.

FIG. 16 is a graph showing the storage modulus (MPa) of various embodiments of the disclosed polymer blends over a temperature range of 0° C. to 250° C.

FIG. 19 shows some examples of foam nucleating agents.

DETAILED DESCRIPTION OF THE PREFERRED EMBODIMENTS

Figure 1A:
FIGS. 1A and 1B are photographs showing surface uniformity and smoothness of an embodiment of the disclosed polymer blends in pellet form.
Figure 1B:
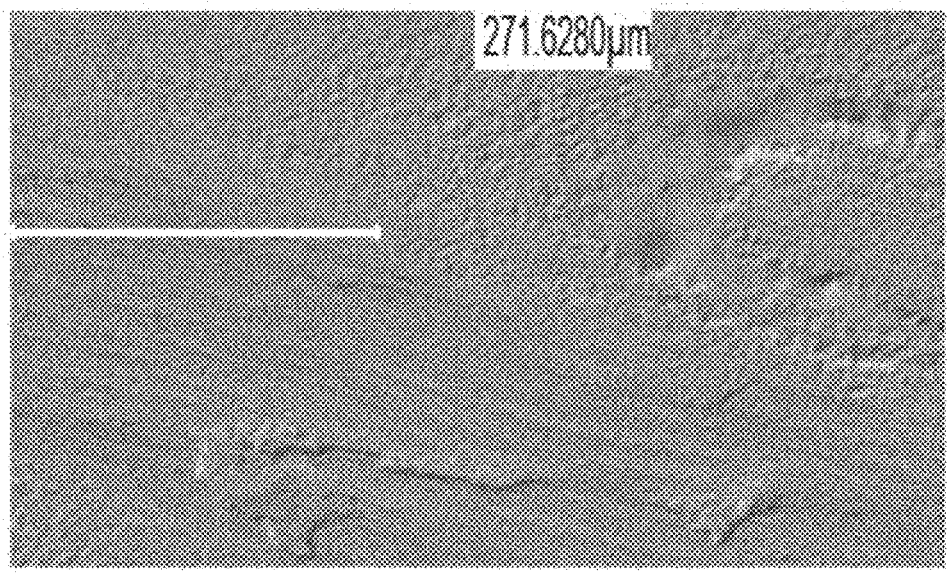
Figure 1C:
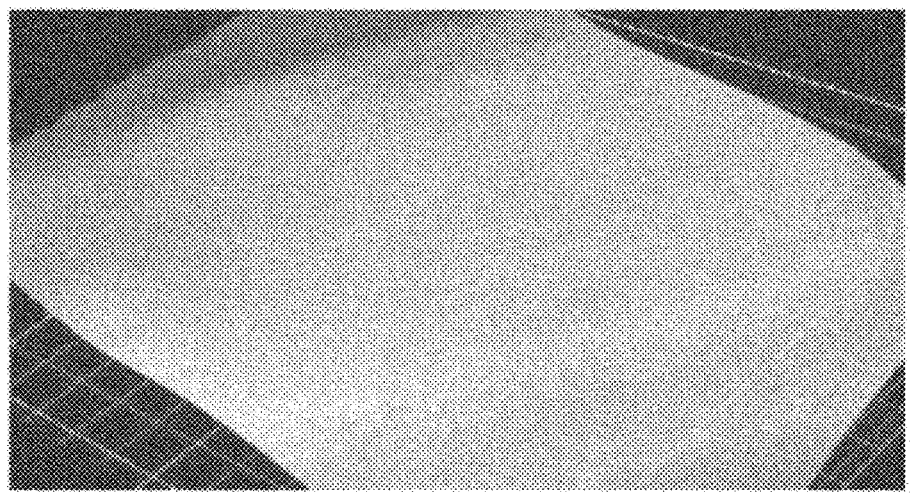
FIGS. 1C and 1D are photographs showing surface uniformity and smoothness of an embodiment of the disclosed polymer blends in pellet form.
Figure 1D:
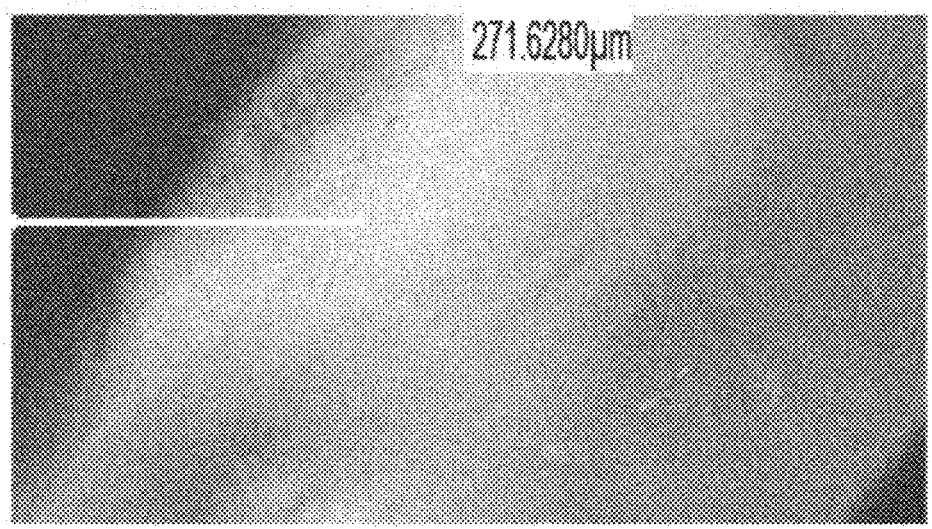

The present invention will next be explained in greater detail with reference to the drawings. However, the present invention should not be construed as being limited thereto.

Definitions

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well, unless the context clearly indicates otherwise.

Terms such as "at least one of A and B" should be understood to mean "only A, only B, or both A and B." The same construction should be applied to longer list (e.g., "at least one of A, B, and C").

With reference to the use of the words "comprise" or "comprises" or "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and the following claims.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

In some places reference is made to standard methods, such as but not limited to methods of measurement. It is to be understood that such standards are revised from time to time, and unless explicitly stated otherwise reference to such standard in this disclosure must be interpreted to refer to the most recent published standard as of the time of filing.

The term, "alkyl," as used herein, refers to the radical of saturated or unsaturated aliphatic groups, including straight-chain alkyl, alkenyl, or alkynyl groups, branched-chain alkyl, alkenyl, or alkynyl groups, cycloalkyl, cyclcoalkenyl, cycloalkynyl groups, alkyl substituted cycloalkyl, cyclcoalkenyl, or cycloalkynyl groups, and cycloalkyl substituted alkyl, alkenyl, or alkynyl groups. Unless otherwise indicated, a straight chain or branched chain alkyl has 33 or fewer carbon atoms in its backbone, preferably 20 or fewer, and more preferably 12 or fewer.

The term, "alkyl," also includes one or more substitutions at one or more carbon atoms of the hydrocarbon radical as well as heteroalkyls. Suitable substituents include, but are not limited to, halogens, such as fluorine, chlorine, bromine, or iodine; hydroxyl; —$NR_1R_2$, wherein $R_1$ and $R_2$ are independently hydrogen, alkyl, or aryl, and wherein the nitrogen atom is optionally quaternized; —SR, wherein R is hydrogen, alkyl, or aryl; —CN; —$NO_2$; —COOH; carboxylate; —COR, —COOR, or —$CONR_2$, wherein R is hydrogen, alkyl, or aryl; azide, aralkyl, alkoxyl, imino, phosphonate, phosphinate, silyl, ether, sulfonyl, sulfonamido, heterocyclic, aromatic or heteroaromatic moieties, —$CF_3$; —CN; —$NCOCOCH_2CH_2$; —NCOCOCHCH; —NCS; and combinations thereof.

The terms "alkenyl" and "alkynyl", as used herein, refer to unsaturated aliphatic groups analogous in length and possible substitution to the alkyls described above, but that contain at least one double or triple bond respectively.

The term "aryl" refers to a mono- or multi-cyclic aromatic radical having in the range of 6 up to 20 carbon atoms such as phenyl, naphthyl, tetrahydronapthyl, indanyl, and biphenyl.

The term, "heteroaryl," as used herein, refers to straight or branched chain, or cyclic carbon-containing radicals, or combinations thereof, having 3 to 20 carbon atoms where one or more of the carbon atoms are replaced by heteroatoms. Suitable heteroatoms include, but are not limited to, O, N, Si, P and S, where the nitrogen, phosphorous and sulfur atoms are optionally oxidized, and the nitrogen heteroatom is optionally quaternized. One of the rings may also be aromatic. Examples of heterocyclic and heteroaromatic rings include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH-carbazolyl, carbolinyl, chromanyl, chromenyl, cinnolinyl, decahydroquinolinyl, 2H,6H-1,5,2-dithiazinyl, dihydrofuro[2,3-b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl and xanthenyl.

Fluoropolymer and Non-Fully Fluorinated Polymer Blends

Blends of a fluorinated polymer and a non-fully fluorinated polymer are provided. Generally speaking fluorinated polymers and non-fluorinated polymers are immiscible and difficult to blend. However, it has been discovered that better compatibility between these two classes of polymers can be achieved by adding functional end and/or pendant groups to the fluorinated and non-fluorinated polymers.

In one embodiment, the polymer blends disclosed herein include at least a functionalized fully fluorinated fluoropolymer and a non-fully fluorinated polymer. The term "fully fluorinated" as used herein refers to a group in which the carbon atoms are bonded either to fluorine atoms, carbon atoms, or heteroatoms that are bonded to other carbon atoms (i.e., part of the polymer chain). For purposes of the present disclosure, the functionalized fully fluorinated fluoropolymers described herein should have at least one section that is fully fluorinated. The functionalized fully fluorinated fluoropolymer includes at least one functional group. As used herein, "functional group" refers to any reactive group that is capable of forming a chemical bond, for instance, by covalent, hydrogen, or ionic bonding, with another polymer in the blend (e.g. the non-fully fluorinated polymer). The functional group may be a terminal end group or a pendant side group. The functional groups may also be bifunctional or multifunctional. For instance, in one embodiment, the polymer may include two or more functional end groups. Some embodiments of the functionalized fluoropolymer have an end group count of at least 1, 10, 20, 30, 40, 50, 60, 70, 80, 90, 100, 120, 140, 160, 180, 200, 300, 400 or 500 reactive groups per $10^6$ carbon atoms. In another embodiment, the polymer may include from one to four pendant groups. Examples of functional end or pendant groups include, but are not limited to, carboxyl, amine, anhydride, hydroxyl, epoxy, sulfhydryl, siloxane, and oxazoline.

The functionalized fully fluorinated fluoropolymer may include any fluoropolymer having all carbon atoms saturated with fluorine and at least one functional group. Suitable fluoropolymers include, but are not limited to, fluorinated ethylene propylene (FEP), perfluoroalkoxy alkane (PFA), polyvinylidene fluoride (PVDF), ethylene tetrafluoroethylene (ETFE), and/or ethylene tetrafluoroethylene hexafluoropropylene copolymer (EFEP). The functionalized fluoropolymer may be produced by adding a functional group, such as those described above, to any of contemplated fully fluorinated fluoropolymers. Various methods for incorporating functional groups into polymers are known in the art. For instance, the fully fluorinated fluoropolymer may be grafted with a functional monomer to provide a chemical reactive group. The grafting of the functional monomer may be performed by reaction extrusion or by inserting the monomer in a small mole percentage during chemical synthesis. Both methods require a peroxide initiator for successful grafting. Other methods for incorporating functional groups into polymers include, for example, by direct polymerization of functional monomers, post-polymerization modification of monomer units, use of functional initiators, or end-group transformation chemistry such as nucleophilic substitution reactions.

In one embodiment, the functionalized fully fluorinated fluoropolymer is fluorinated ethylene propylene (FEP) having at least one functional group selected from carboxyl, amine, anhydride, hydroxyl, epoxy, sulfhydryl, siloxane, oxazoline, and combinations thereof. In a specific embodiment, the functionalized fully fluorinated fluoropolymer is FEP having at least one carboxyl group.

The non-fully fluorinated polymer present in the blend may be functionalized or not functionalized. The term "non-fully fluorinated" as used herein refers to (i) a non-fluorinated polymer where no carbon atoms are saturated with fluorine or (ii) a partially-fluorinated polymer where some, but not all, carbon atoms are saturated with fluorine, there being some carbon atoms bound to at least one hydrogen. In one embodiment, the non-fully fluorinated polymer is not functionalized. In this aspect, the non-fully fluorinated polymer may form a hydrogen bond or an ionic bond with the functionalized fully fluorinated fluoropolymer.

The non-functionalized non-fully fluorinated polymer may include any polymer that is not fully fluorinated and does not contain a functional group. In one embodiment, the non-functionalized non-fully fluorinated polymer is a non-fluorinated polymer, i.e., the polymer does not contain fluorine. In another embodiment, the non-functionalized non-fully fluorinated polymer is partially fluorinated. Suitable non-fluoropolymers and partially fluorinated polymers for use with the present disclosure include, but are not limited to, polyimide, polyetherimide, polyamide-imide, polyamide, polysulfone, polyphenylsulphide, polyether ether ketone, and aromatic polyesters (liquid crystal). For example, in one embodiment, the non-fully fluorinated polymer is a polyetherimide having the following formula:

[Chem. 1]

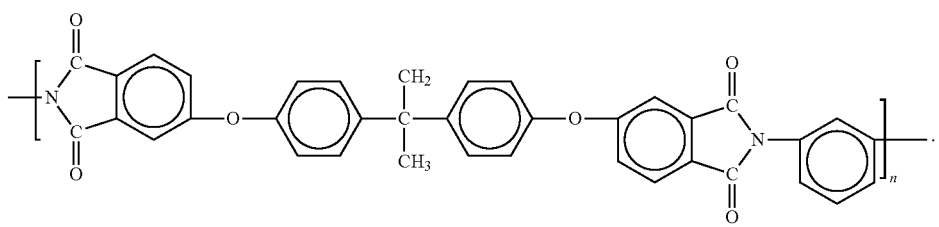

In another embodiment, the non-fully fluorinated polymer may be functionalized. For instance, the non-fully fluorinated polymer may include a functional group capable of forming a chemical bond with the functional group of the fully fluorinated fluoropolymer. In this aspect, the functional group of the non-fully fluorinated polymer reacts with the functional group of the fully fluorinated fluoropolymer to form a copolymer.

The functionalized non-fully fluorinated polymer may include any of the polymers described above with respect to the non-functionalized non-fully fluorinated polymer but with the addition of a functional group. For example, the functionalized non-fully fluorinated polymer may be a non-fluoropolymer or partially fluorinated polymer selected from a polyimide, polyetherimide, polyamide-imide, polyamide, polysulfone, polyphenylsulphide, polyether ether ketone, and aromatic polyesters (liquid crystal), where the non-fluoropolymer or partially fluorinated polymer has a functional group. The functional group of the functionalized non-fully fluorinated polymer may be the same or different from the functional group of the fully fluorinated fluoropolymer. For instance, the functional group of the functionalized non-fully fluorinated polymer may include one or more functional end or pendant groups including, but not limited to, carboxyl, amine, anhydride, hydroxyl, epoxy, sulfhydryl, siloxane, and oxazoline.

In one embodiment, the functionalized non-fully fluorinated polymer is a polyetherimide or polyimide having a carboxylic acid, anhydride, or amine end group. In another embodiment, the functionalized non-fully fluorinated polymer is a polyetherimide having an anhydride end group. In still another embodiment, the functionalized non-fully fluorinated polymer is an anhydride-terminated polyimide having the following formula:

[Chem. 2]

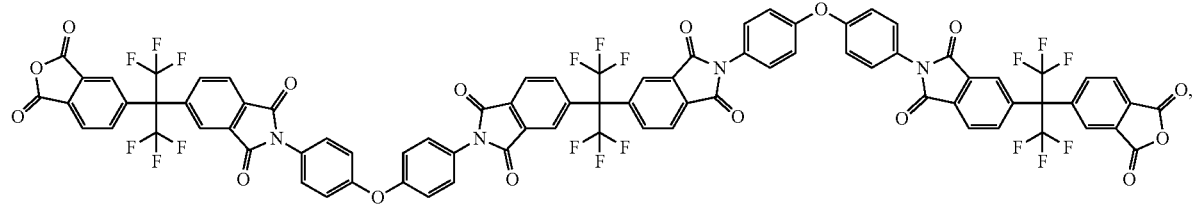

In yet another embodiment, the functionalized non-fully fluorinated polymer is a polyetherimide having a carboxylic acid end group. In still another embodiment, the functionalized non-fully fluorinated polymer is a polyetherimide having an amine end group.

The polymer blend may include a combination of the non-fully fluorinated polymer that is not functionalized and a non-fully fluorinated polymer that is functionalized where the functional group is capable of forming a chemical bond with the functional group of the fully fluorinated fluoropolymer.

The polymer blends described herein may also include a non-functionalized fluoropolymer. The non-functionalized fluoropolymer may be any fluoropolymer that has not been modified to have a functional group. In one embodiment, the non-functionalized fluoropolymer may be the same fluoropolymer as the functionalized fully fluorinated fluoropolymer, without the functional group. In another embodiment, the non-functionalized fluoropolymer may be a different fluoropolymer from the functionalized fully fluorinated fluoropolymer. The non-functionalized fluoropolymer may be fully fluorinated or partially fluorinated. Suitable fluoropolymers for use as the non-functionalized fluoropolymer include, but are not limited to, ethylene tetra-fluoroethylene (ETFE), fluorinated ethylene propylene (FEP), perfluoroalkoxy alkane (PFA), polyvinylidene fluoride (PVDF), and a terpolymer of ethylene, tetrafluoroethylene, and hexafluoropropylene (EFEP).

The above-mentioned fluoropolymers may be foamed or in solid form. In one embodiment, the fluoropolymer has a foamed structure. If a foamed polymer is to be formed, a foam nucleating agent may be present. Foamed polymers have the advantage of improved dielectric properties and lower weight. Some embodiments of the polymer blend may comprise 1-10% w/w of the foam nucleating agent. Various suitable nucleating agents are known in the art, and may include components such as boron nitride, inorganic salts (such as barium salts, calcium tetraborate, sodium tetraborate, potassium tetraborate, calcium carbonate, zinc tetraborate, and barium nitrate), sulfonic acid, phosphonic acids, conjugate salts thereof, talc, and metal oxides such as magnesium oxide, aluminum oxide, and silicon dioxide. A specific embodiment of the polymer blend comprises a foam nucleating agent comprising mostly boron nitride and calcium tetraborate. Further embodiments additionally comprise a barium salt of $F(CF_2)_nCH_2CH_2SO_3H$ (n=6, 8, 10, or 12). Among foam nucleating agents that may constitute, or may be components of, the foam nucleating package are the foam nucleating agents represented by the formula $Z(CF_2)_x(CF_2CFX)_p(R')_y(CH_2)_z(RO_3)_nM$ wherein: the bivalent groups, except for $RO_3$, may be present in any sequence; Z is selected from $CCl_3$, $CCl_2H$, H, F, Cl, and Br; each X, independently, is selected from H, F, $C_1$ and $CF_3$; R is selected from sulfur and phosphorus; M is selected from H and a metallic, ammonium, substituted ammonium and quaternary ammonium cation; each of x and z, independently, is an integer and is 0 to 20; p is an integer and is 0 to 6; y is 0 or 1; x+y+z+p is a positive integer or, if x+y+z+p is 0, then Z is $CCl_3$ or $CCl_2H$; n is the valence of M; and R' is selected from a $C_{5-6}$ perfluorinated alicyclic ring diradical; a $C_{1-16}$ perfluorinated aliphatic polyether diradical with repeat units selected from $CF_2O$, $[CF_2CF_2O]$, and $[CF_2CF(CF_3)O]$; and a substituted or unsubstituted aromatic diradical, in which case, Z is H. Embodiments of the foam nucleating agent suitable for extrusion processes may have a foam nucleating effective amount of at least one thermally stable compound selected from sulfonic and phosphonic acids and/or salts thereof. Examples of foam nucleating agents are provided in FIG. 19. "TBSA" is $F(CF_2)_nCH_2CH_2SO_3H$ wherein n is 6, 8, 10, and possibly 12, being predominately 8.

The polymer blends disclosed herein may include at least the functionalized fully fluorinated fluoropolymer and the non-fully fluorinated polymer. In another embodiment, the polymer blends include the functionalized fully fluorinated fluoropolymer, one or more of the non-fully fluorinated polymers, and the non-functionalized fully or partially fluorinated fluoropolymer. In still another embodiment, the polymer blends include the non-functionalized fully or partially fluorinated fluoropolymer, the functionalized fully fluorinated fluoropolymer, the non-functionalized non-fully fluorinated polymer, and the functionalized non-fully fluorinated polymer, where the functional groups of the functionalized fully fluorinated fluoropolymer and the functionalized non-fully fluorinated polymer are capable of reacting to form a chemical bond. Without being bound by any particular theory, it is believed that the presence of the non-functionalized fully or partially fluorinated fluoropolymer and the non-functionalized non-fully fluorinated polymer create an environment in which the functionalized fully fluorinated fluoropolymer and the functionalized non-fully fluorinated polymer are mutually miscible and can be chemically bound to one another.

In one embodiment of the compatibilized blend, the mixture of non-fluorinated and fully fluorinated polymer having functional end or pendant groups can form hydrogen or ionic bonds with any polymer with similar processing temperature that is an engineering or high performance non-functionalized non-fluoropolymer. Other versions of the engineering or high performance non-fluoropolymer are functionalized. This aids in enhancing compatibilization by reacting chemically with the compatibilizer or directly with the functionalized fully fluorinated polymer. In some embodiments the functionalized group reacts covalently with the compatibilizer. A covalent bond in this sense refers to opposite groups with nucleophilic and electrophilic centers that can form a chemical bond.

The non-functionalized fully or partially fluorinated fluoropolymer, the functionalized fully fluorinated fluoropolymer, the non-functionalized non-fully fluorinated polymer, and the functionalized non-fully fluorinated polymer may be present in the polymer blend in varying amounts. In one embodiment, the functionalized fully fluorinated fluoropolymer and the non-functionalized fully or partially fluorinated fluoropolymer may be present in an amount of about 1% w/w to about 99% w/w of the blend. In another embodiment, the functionalized fully fluorinated fluoropolymer and the non-functionalized fully or partially fluorinated fluoropolymer may be present in an amount of about 1% w/w to about 90% w/w of the blend. In some embodiments, the functionalized fully fluorinated fluoropolymer and the non-functionalized fully or partially fluorinated fluoropolymer may be present in an amount of 5%, 10%, 15%, 20%, 25%, 30%, 35%, 40%, 45%, 50%, 55%, 60%, 65%, 70%, 75%, 80%, 85%, 90%, 95%, 98%, or 99% w/w of the blend, about any of the foregoing values, or a range between any two of the foregoing values. In a specific embodiment, the functionalized fully fluorinated fluoropolymer and the non-functionalized fully or partially fluorinated fluoropolymer may be present in an amount of about 80% w/w to about 95% w/w of the blend. In another specific embodiment, the functionalized fully fluorinated fluoropolymer and the non-functionalized fully or partially fluorinated fluoropolymer may be present in an amount of about 85% w/w to about 95% w/w of the blend. In a further specific embodiment, there is no non-functionalized fully or partially fluorinated fluoropolymer present.

The relative amounts of the functionalized fully fluorinated fluoropolymer and the non-functionalized fully or partially fluorinated fluoropolymer may range up to 100% functionalized fully fluorinated fluoropolymer and 0% non-functionalized fully or partially fluorinated fluoropolymer. In some embodiments of the composition the ratio of fully fluorinated fluoropolymer to non-functionalized fully or partially fluorinated fluoropolymer is 0.1-1. In specific embodiments of the composition the ratio of fully fluorinated fluoropolymer to non-functionalized fully or partially fluorinated fluoropolymer may be 0.10, 0.11, 0.20, 0.25, 0.30, 0.35, 0.40, 0.45, 0.50, 0.55, 0.60, 0.65, 0.70, 0.75, 0.80, 0.85, 0.90, 0.95, and 1. In certain preferred embodiments of the composition the ratio of fully fluorinated fluoropolymer to non-functionalized fully or partially fluorinated fluoropolymer may be 0.11, 0.25, 0.40 or 1.

The non-functionalized non-fully fluorinated polymer may be present in the blend in an amount of about 1% w/w to about 99% w/w of the blend. For instance, the non-functionalized non-fully fluorinated polymer may be present in an amount of 1%, 2%, 3%, 4%, 5%, 10%, 15%, 20%, 25%, 30%, 35%, 40%, 45%, 50%, 55%, 60%, 65%, 70%, 75%, 80%, 85%, 90%, 95%, 98%, or 99% w/w of the blend, about any of the foregoing values, or a range between any two of the foregoing values. In another embodiment, the non-functionalized non-fully fluorinated polymer may be present in an amount of about 5% w/w to about 90% w/w of the blend. In a specific embodiment, the non-functionalized non-fully fluorinated polymer may be present in an amount of about 5% w/w to about 15% w/w of the blend. In another specific embodiment, the non-functionalized non-fully fluorinated polymer may be present in an amount of about 5% w/w to about 10% w/w of the blend. In a further specific embodiment, the non-functionalized non-fully fluorinated polymer may be present in an amount of about 85-90% w/w of the blend, or about 88% w/w of the blend.

The functionalized non-fully fluorinated polymer may be present in the blend in an amount of about 0.1% w/w to about 99% w/w of the blend. For example, the functionalized non-fully fluorinated polymer may be present in an amount of 0.1%, 0.5%, 1%, 2%, 3%, 4%, 5%, 10%, 15%, 20%, 25%, 30%, 35%, 40%, 45%, 50%, 55%, 60%, 65%, 70%, 75%, 80%, 85%, 90%, 95%, 98%, or 99% w/w of the blend, about any of the foregoing values, or a range between any two of the foregoing values. In another embodiment, the functionalized non-fully fluorinated polymer may be present in an amount of about 0.1% w/w to about 3% w/w of the blend. In still another embodiment, the functionalized non-fully fluorinated polymer may be present in an amount of about 1% w/w to about 2% w/w of the blend.

The polymer blends disclosed herein may further include at least one compatibilizing agent, although the compatibilizing agent is optional. Compatibilizing agents are additives that, when added to a blend of immiscible materials during extrusion, modify the interfacial properties of the immiscible materials and stabilize the melt blend. Compatibilizing the system makes a more stable and better blended phase morphology by creating interactions between the two immiscible polymers.

In one embodiment, the compatibilizing agent may include at least two functional end groups, for example, one functional group on each end, where each of the functional end groups are capable of reacting with one or both of the functional groups of the functionalized fully fluorinated fluoropolymer and the functionalized non-fully fluorinated fluoropolymer to form chemical bonds. In another embodiment, the compatibilizing agent may include from two to five functional groups on each end. The functional groups of the compatibilizing agent may include any of the functional groups described above with respect to the functionalized fully fluorinated fluoropolymer and the functionalized non-fully fluorinated fluoropolymer. For example, the compatibilizing agent may include any of the following functional end groups: carboxyl, amine, anhydride, hydroxyl, epoxy, sulfhydryl, siloxane, and oxazoline. In one embodiment, the one or more functional groups on each end of the compatibilizing agent may be identical. In another embodiment, the one or more functional groups on one end of the compatibilizing agent may be different from the one or more functional groups on the other end of the compatibilizing agent.

In another embodiment, the compatibilizing agent may be a reactive polymer compatibilizer such as, for example, a block or graft copolymer with segments structurally similar to each of the polymers present in the polymer blend. In this aspect, the compatibilizing agent may be a copolymer formed of the polymer components present in the blend.

In still another embodiment, the compatibilizing agent may be a bis(oxazoline) compound. Bis(oxazoline) compounds have at least two functional end groups joined by a linking group. More specifically, bis(oxazoline) compounds have at least two functional oxazoline rings on each end that are joined by a linking group. The linking group may include straight-chain alkyl, alkenyl, or alkynyl groups, branched-chain alkyl, alkenyl, or alkynyl groups, cycloalkyl, cyclcoalkenyl, cycloalkynyl groups, alkyl substituted cycloalkyl, cyclcoalkenyl, or cycloalkynyl groups, cycloalkyl substituted alkyl, alkenyl, or alkynyl groups, aryl groups such as phenyl, naphthyl, tetrahydronapthyl, indanyl, and biphenyl, heteroaryl groups such as pyridinyl groups, alkyl groups including one or more substitutions at one or more carbon atoms of the hydrocarbon radical, and combinations thereof. The oxazoline rings may also include one or more substituents. The substituents may be include any of the groups described above with respect to the linking group.

Examples of suitable bis(oxazoline) compounds for use as compatibilizing agents include but are not limited to:

1,3-phenylene-bis-oxazoline

[Chem. 3]

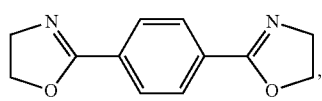

1,4-Bis(4,5-dihydro-2-oxazolyl)benzene

[Chem. 4]

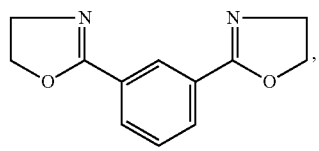

1-4-Bis(2-benzoxazolyl)naphthalene

[Chem. 5]

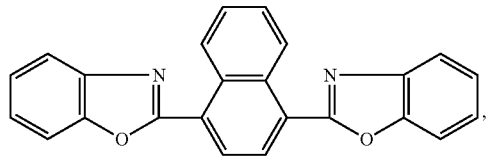

1,3-Bis(4,5-dihydro-2-oxazolyl)benzene

[Chem. 6]

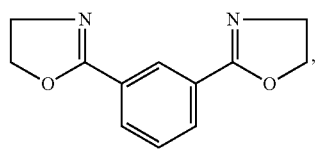

1,4-Bis(5-phenyl-2-oxazolyl)benzene

[Chem. 7]

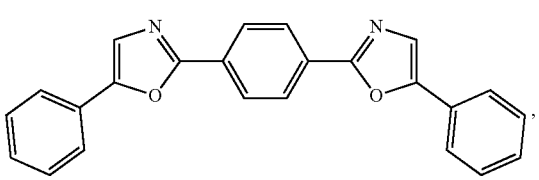

S,S)-2,2'-Isopropylidenebis(4-isopropyl-2-oxazoline)

[Chem. 8]

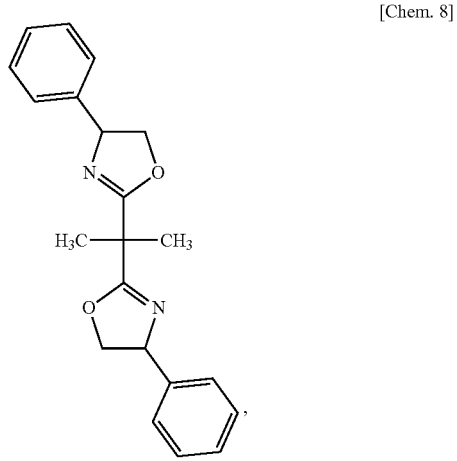 [SMILES: CC(C)(C1=NC(c2ccccc2)CO1)C1=NC(c2ccccc2)CO1]

(R,R)-2,6-Bis(4-phenyl-2-oxazolin-2-yl)pyridine

[Chem. 9]

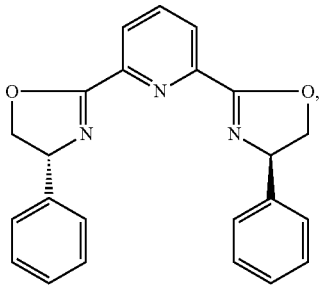

2,2'-Methylenebis[(4S)-4-phenyl-2-oxazoline

[Chem. 10]

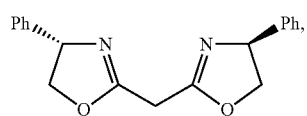

2,5-Bis(5-tert-butyl-benzoxazol-2-yl)thiophene

[Chem. 11]

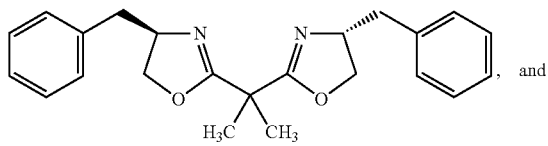

, and (4S)-(+)-Phenyl-α-[(4S)-phenyloxazolidin-2-ylidene]-2-oxazoline-2-acetonitrile

[Chem. 12]

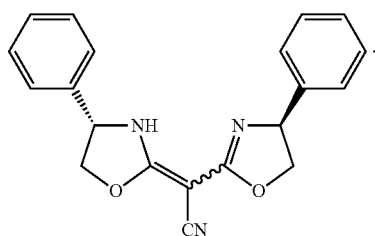

In a specific embodiment, the compatibilizing agent is 1,4-Bis(4,5-dihydro-2-oxazolyl)benzene.

The compatibilizing agent may be present in the polymer blend in an amount of about 0.1% w/w to about 99% w/w. For example, the compatibilizing agent may be present in an amount of 0.1%, 0.5%, 1%, 2%, 3%, 4%, 5%, 10%, 15%, 20%, 25%, 30%, 35%, 40%, 45%, 50%, 55%, 60%, 65%, 70%, 75%, 80%, 85%, 90%, 95%, 98%, or 99% w/w of the blend, about any of the foregoing values, or a range between any two of the foregoing values. In a specific embodiment, the compatibilizing agent may be present in an amount of about 0.1% w/w to about 1% w/w of the blend. In another specific embodiment, the compatibilizing agent may be present in an amount of about 0.1% w/w to about 0.5% w/w of the blend.

Forming Polymer Alloys

The polymer blends described herein may be formed into polymer alloys. "Polymer alloy" as used herein refers to a mixture of at least two polymers that are blended together to create a new material with different physical properties.

A process of forming a polymer alloy is provided, the process comprising maintaining any of the above-described polymer blends at a temperature sufficient to melt the functionalized fully fluorinated fluoropolymer and sufficient to melt the non-fully fluorinated polymer and/or the functionalized non-fully fluorinated polymer, and sufficient to permit covalent, ionic, or hydrogen bonding between the functional group of the functionalized fully fluorinated fluoropolymer and the non-fully fluorinated polymer and/or the functionalized non-fully fluorinated polymer.

In another embodiment, the process of forming a polymer alloy includes maintaining any of the above-described polymer blends at a temperature sufficient to melt the fully fluorinated fluoropolymer, the functionalized fully fluorinated fluoropolymer, the non-fully fluorinated polymer, and the functionalized non-fully fluorinated polymer, and sufficient to permit chemical bonding between the functional group of the functionalized fully fluorinated fluoropolymer and the functional group of the functionalized non-fully fluorinated polymer.

The melting temperatures of the polymer components can be easily ascertained by those of ordinary skill in the art. In one embodiment however, the temperature sufficient to melt the fully fluorinated fluoropolymer, the functionalized fully fluorinated fluoropolymer, the non-fully fluorinated polymer, and the functionalized non-fully fluorinated polymer may range from about 250° to about 400° C. In another embodiment, the temperature may range from about 280° to 350° C. The polymers may be maintained at these temperatures for about one minute to about ten minutes. In another embodiment, the polymers may be maintained at these temperatures for about two minutes.

In some embodiments, foamed polymer blends can be formed if the blends contain a foaming agent, as described above. In such embodiments of the process, a gas will be introduced during processing. The gas can be any that is known in the art to be suitable for forming foamed fluoropolymers. In a specific embodiment, the gas is $N_2$, which has the advantage of being relatively inert and low in cost. In some embodiments of the process, the gas is introduced to achieve up to 90% gas content by volume. In further embodiments of the process, the gas is introduced to achieve 10-80% gas content by volume.

Extruded Workpieces and Processes of Manufacture

An extruded workpiece comprising any of the polymer alloys provided above and processes of manufacturing an extruded polymer workpiece are provided. The workpiece may be any extruded polymer workpiece known in the art. Specific examples of suitable extruded workpieces include a bag, film, container, filament, food package, coating (such as a coating or jacketing for a wire), and various injection molded parts.

In one embodiment, the extruded workpiece is a film of any of the polymer alloys described above. A process of forming a film of a polymer alloy is also provided, the process comprising forming a polymer alloy by the method described above to form a molten alloy, and extruding the molten alloy to form a thin film. In this aspect, the polymer blend may be melt blended to form a molten alloy and extruded to a pellet shape. The pellets may then be extruded into a thin film. Any of the known methods for forming films are contemplated for use with the present disclosure.

Some embodiments of the films formed from the polymer alloys described herein show a significant improvement in mechanical strength over films formed from pure fluorinated polymers. For example, the films demonstrate superior tensile strength. As used herein, "tensile strength" refers to the amount of stress a material can handle before reaching permanent, non-elastic deformation as measured in accordance with ASTM D638. In one embodiment, the films demonstrate a tensile strength of greater than about 15 MPa. In another embodiment, the films demonstrate a tensile strength of greater than about 17 MPa. In still another embodiment, the films demonstrate a tensile strength of greater than about 22 MPa. In yet another embodiment, the films demonstrate a tensile strength of greater than about 24 MPa. In another embodiment, the films demonstrate a tensile strength of greater than about 27 MPa. In still another embodiment, the films demonstrate a tensile strength of greater than about 30 MPa.

Some embodiments of the films also demonstrate superior elongation properties. "Elongation" refers to the percentage increase in length that occurs before the material breaks under tension. In one embodiment, the films demonstrate an elongation of less than about 250%. In another embodiment, the films demonstrate an elongation of less than about 200%. In still another embodiment, the films demonstrate an elongation of less than about 180%. In yet another embodiment, the films demonstrate an elongation of less than about 100%. In another embodiment, the films demonstrate an elongation of less than about 50%. In yet another embodiment, the films demonstrate an elongation of less than about 30%. In still another embodiment, the films demonstrate an elongation of less than about 20%.

Some embodiments of the films further demonstrate superior Young's modulus properties. "Modulus" refers to the tendency for a material to resist being deformed elastically as measured in accordance with ASTM D638. In one embodiment, the films have a Young's modulus greater than about 400 MPa. In another embodiment, the films have a Young's modulus greater than about 450 MPa. In yet another embodiment, the films have a Young's modulus greater than about 480 MPa. In still another embodiment, the films have a Young's modulus greater than about 500 MPa. In yet another embodiment, the films have a Young's modulus greater than about 600 MPa. In another embodiment, the films have a Young's modulus greater than about 650 MPa. In still another embodiment, the films have a Young's modulus greater than about 750 MPa. In another embodiment, the films have a Young's modulus greater than about 800 MPa. For instance, the films have a Young's modulus greater than about 850 MPa.

Some embodiments of the films also demonstrate superior yield strength. "Yield strength" refers to the maximum stress that can be applied before the material begins to change shape. In one embodiment, the films have a yield strength greater than about 15 MPa. In another embodiment, the films have a yield strength greater than about 20 MPa. In still another embodiment, the films have a yield strength greater than about 29 MPa. In yet another embodiment, the films have a yield strength greater than about 40 MPa.

In another embodiment, the extruded workpiece is an injection molded part of any of the polymer alloys described above. A process of forming an injection molded workpiece of a polymer alloy is also provided, the process comprising forming a polymer alloy by the method described above to form a molten alloy, and injecting the molten alloy into a mold cavity. In this aspect, the polymer blend may be melt blended to form a molten alloy and extruded to a pellet shape. The compound is then injection molded using any suitable injection molding machine. Any of the known methods for injection molding are contemplated for use with the present disclosure.

Some embodiments of the injection molded workpieces formed from the polymer alloys described herein show superior mechanical properties over injection molded workpieces formed from pure fluorinated polymers. For example, some embodiments of the injection molded workpieces demonstrate a tensile strength of greater than 10 MPa. In another embodiment, the injection molded workpieces demonstrate a tensile strength of greater than 15 MPa. In still another embodiment, the injection molded workpieces demonstrate a tensile strength of greater than 20 MPa. In another embodiment, the injection molded workpieces demonstrate a tensile strength of greater than 50 MPa. In yet another embodiment, the injection molded workpieces demonstrate a tensile strength of greater than 100 MPa.

Some embodiments of the injection molded workpieces also demonstrate superior elongation properties. In one embodiment, the injection molded workpieces have an elongation of less than about 200%. In another embodiment, the injection molded workpieces have an elongation of less than about 180%. In still another embodiment, the injection molded workpieces have an elongation of less than about 150%. In yet another embodiment, the injection molded workpieces have an elongation of less than about 100%. In another embodiment, the injection molded workpieces have an elongation of less than about 80%. In still another embodiment, the injection molded workpieces have an elongation of less than about 30%. For example, the injection molded workpieces have an elongation of less than about 20%.

Some embodiments of the injection molded workpieces further demonstrate superior Young's modulus properties. For instance, the injection molded workpieces have a Young's modulus of greater than about 350 MPa. In another embodiment, the injection molded workpieces have a Young's modulus of greater than about 400 MPa. In still another embodiment, the injection molded workpieces have a Young's modulus of greater than about 500 MPa. In yet another embodiment, the injection molded workpieces have a Young's modulus of greater than about 600 MPa. In still another embodiment, the injection molded workpieces have a Young's modulus of greater than about 620 MPa.

Moreover, some embodiments of the injection molded workpieces show superior yield strength. In one embodiment, the injection molded workpieces have a yield point greater than about 17 MPa. In another embodiment, the injection molded workpieces have a yield point greater than about 20 MPa. In still another embodiment, the injection molded workpieces have a yield point greater than about 50 MPa. In yet another embodiment, the injection molded workpieces have a yield point greater than about 75 MPa.

Communications Cable

The polymer alloys disclosed herein find use as cable insulators due to their light weight, temperature resistance, and dielectric properties. An insulated cable is provided comprising a conductor and an insulating layer comprising any of the polymer alloys disclosed herein.

This disclosure describes embodiments of a communications cable, such as an Ethernet cable. The cable is particularly useful in motor vehicle computer systems, which are exposed to high temperatures but have ever increasing data demands. One particular embodiment of the cable includes a single twisted pair of wires. The wire insulation of each of these wires is provided by highly insulative, low attenuation, and thermally resistant material such as the polymer alloys disclosed above. The twisted pair of wires are configured to carry differential data and/or power signals. The use of the polymer alloys disclosed above as a wire insulator allows for the cable to transmit differential signals within high frequency ranges (e.g., 10 MHz-10 GHz) while being capable of handling the more extreme thermal conditions presented by a motor vehicle. It should be noted that other embodiments of the cable may include several pairs of wires to provide multiple paths for differential data and/or power signals. Further embodiments of the cable comprise more than one twisted pair. Specific embodiments of the cable comprise at least 1, 2, 3, or 4 twisted pairs. Still further specific embodiments of the cable comprise exactly 1, 2, 3, or 4 twisted pairs. These pairs of wires may be inserted within a cable jacket, which provides the Ethernet cable with its structural integrity. Furthermore, in some implementations, the cable may be shielded to help protect the cable from electromagnetic interference.

Figure 17:
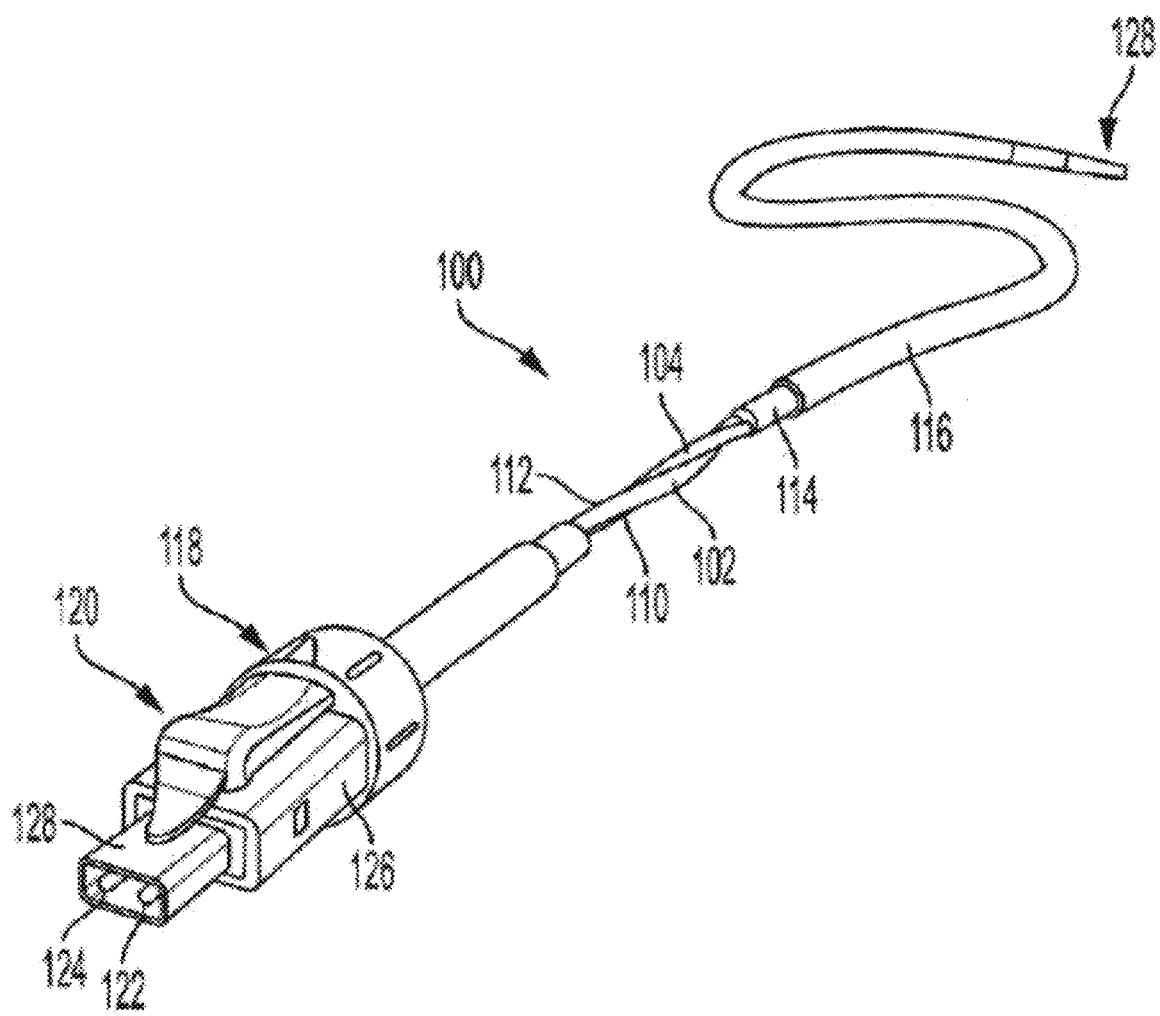
FIG. 17 is an embodiment of the insulated cable disclosed.
Figure 18:
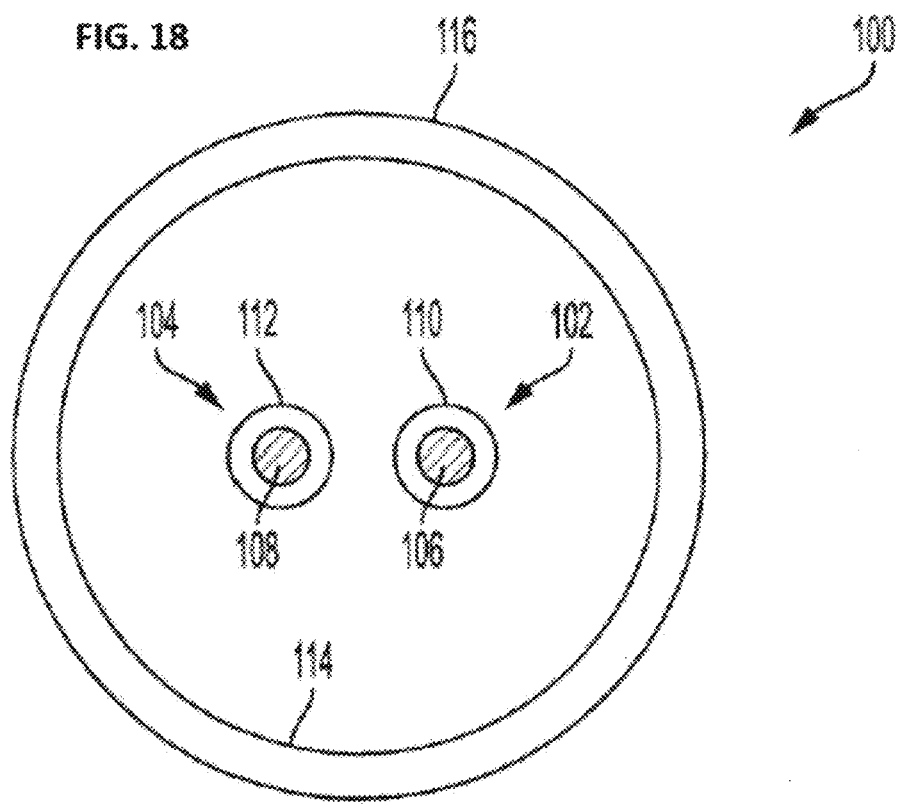
FIG. 18 is a cross-sectional view of an embodiment of the insulated cable disclosed.

FIG. 17 illustrates a perspective view of an embodiment of a cable 100 in accordance with this disclosure while FIG. 18 illustrates a cross sectional view of the embodiment of a cable 100 shown in FIG. 17. The cable 100 includes a pair of wires 102, 104 that are twisted together so as to form a twisted pair of wires 102, 104. The wire 102 includes a conductor 106 (See FIG. 18) while the wire 104 includes a conductor 108 (See FIG. 18) that are each formed from a conductive material. The conductive material that forms the conductors 106, 108 may be any conductive material, including elemental metals, alloys, and the like. In one embodiment, the conductors 106, 108 in the wires 102, 104 are each formed from copper. The pair of conductors 106, 108 may be used in some implementations to propagate a differential signal, such that the conductors 106, 108 carry complementary signals that are approximately 180 degrees apart in phase. Thus, the pair of wires 102, 104 are twisted to help cancel electromagnetic interference between the wires 102, 104 and maintain the pair of conductors 106, 108 balanced. In one implementation, the pair of wires 102, 104 will be used to handle both data signaling and power transmission. For example, the pair of wires 102, 104 may be utilized to deliver around 50 Watts of power to sensors and active communications devices.

As shown in FIG. 17 and FIG. 18, each of the wires 102, 104 also includes wire insulation 110, 112. The wire insulation 110 of the wire 102 surrounds and covers the conductor 106 while the wire insulation 112 of the wire 104 surrounds and covers the conductor 108. The wire insulation 110 and the wire insulation 112 are formed from an insulation material that has a low dielectric constant has a low permittivity and thus resists the concentration of electromagnetic lines of flux in the presence of high charges and currents. This allows the pair of wires 102, 104 to propagate high frequency signals. In one implementation, the cable 100 is a Category 6A Ethernet cable, which requires that the cable 100 be capable of carrying signals with an operating frequency between 10 MHz and 500 MHz and a system throughput up to 10 Gigabits per second (Gbps), while minimizing external noise influences and internal crosstalk sources, such as near end crosstalk (NEXT) and far end crosstalk (FEXT). Examples of suitable forms of Category 6A cable 100 include unshielded twisted pair cable (UTP), segmented shield twisted pair (SSTP), and shielded twisted pair (STP). One suitable form of STP comprises a shield having polyethylene terephthalate (PET) on one side and aluminum on the other, and a drain wire. One suitable form of SSTP comprises a shield having polyethylene terephthalate (PET) on one side and aluminum on the other, wherein the aluminum is cut at regular intervals while the PET is intact along the length of the shield, obviating the need for a drain wire.

In some embodiments, the insulation material that forms the wire insulation 110 and the wire insulation 112 has a dielectric constant between approximately 1.2 to approximately 2.4 at temperatures experienced under the hood of modern automotive engines. Typically these temperatures vary from −40° C. to 200° C. In another embodiment, the insulation material that forms the wire insulation 110 and the wire insulation 112 has a dielectric constant between approximately 1.5 to approximately 2.1 at temperatures experienced under the hood of modern automotive engines. In still another embodiment, the insulation material that forms the wire insulation 110 and the wire insulation 112 has a dielectric constant between approximately 1.7 to approximately 2.1 at temperatures experienced under the hood of modern automotive engines.

The insulator of each conductive wire may be at least 50% w/w of the polymer alloy. In further embodiments, each conductive wire may be at least 55, 60, 65, 70, 75, 80, 85, 90, 95, 96, 97, 98, 99, or 100% of the polymer alloy.

The insulation materials may also include additives, modifiers, or reinforcements. For example, the insulation materials may be pigmented or include a colorant for identification purposes.

It should be noted that other embodiments of the cable 100 may be provided so as to be an Ethernet cable of a different category, such as Category 5e, Category 6, Category 7, Category 7A, and Category 8. Alternative embodiments of the cable 100 may be provided as other types of Ethernet cables including 10BASE-T1 or 100BASE-T1 cables. Some of the Ethernet standards that different examples of the cable 100 may comply with include IEEE 802.3cg, IEEE 802.3bw, IEEE 802.3bp, IEEE 802.3ch, IEEE 802.3bu Ethernet standards. Furthermore, some of the cable standards include SAE J3117/1, SAE J3117/2, and SAE J3117/3.

The embodiment of the cable 100 shown in FIG. 17 and FIG. 18 includes a shield 114 and a cable jacket 116 that surround the wires 102, 104 that carry the differential data and/or power signals along the length of the cable 100. In this example, the shield 114 is provided between the wires 102, 104 and the cable jacket 116. The shield 114 is configured to reflect EMI and/or safely conduct EMI to ground. In either case, the shield 100 helps prevent EMI from effecting the conductors 106, 108 in the wires 102, 104. Thus, even if some EMI passes through the shield 100, it is so highly attenuated and does not significantly interfere with the data and/or power signals being transmitted along the conductors 106, 108 of the wires 102, 104.

In this example, the shield 100 is provided as a braid, which may be formed as a woven mesh of a metal such as copper. The shield 100 can thus provide a highly conductive path to ground. This embodiment of the cable 100 is an example of an unshielded twisted pair cable (UTP). In some implementations, the cable 100 is up to 40 meters in length and is particularly useful for use in large trucks. In alternative examples, the shield 100 may be provided as a foil shield, which may be formed by a thin layer of a metal such as aluminum. The foil shield may be attached to a carrier (which may be formed from a material such as polyester) to add strength and ruggedness. In still other examples, the cable 100 may include multiple concentric shields, which is particularly useful in very noisy environments. In still other examples, the cable 100 may be unshielded so that there is no shield 114 between the jacket 116 and the wires 102, 104. This would be an example of an unshielded twisted pair cable (UTP). In some implementations, the UTP may be up to 15 meters in length and be particularly useful in standard consumer automobiles.

The embodiment of the cable 100 shown in FIG. 17 and FIG. 18 also includes the jacket 116, which forms the outermost layer of a cable 100 and is thus whose outer surface is exposed externally to the external environment. Some embodiments of the jacket 116 surround one or both of the shield 114 and the wires 102, 104. In this manner, the jacket 116 is configured to protect the shield, 114, the insulation 110, 112, and the conductors 106, 108 from EMI, external physical forces, heat, and chemical deterioration. The jacket 116 may be formed from any suitable material, such as polyvinyl chloride (PVC), polyurethane (PUR), chlorinated polyethylene (CPE), neoprene, ethylene propylene rubber (EPR), FEP, PFA, or ethylene tetrafluoroethylene (ETFE). In some alternative examples, fillers, plasticizers, activators, and inhibitors may be added to the jacket 116 to enhance a particular physical, electrical, or chemical characteristic of the jacket 116.

The embodiment of the cable 100 shown in FIG. 17 includes a connector 118 that is connected at one end 120 of the cable 100. More specifically, the connector 118 includes a pair of conductive members 122, 124, wherein a corresponding end (not explicitly shown) of the conductor 106 of the wire 102 is connected to the conductive member 122 and a corresponding end (not explicitly shown) of the conductor 108 of the wire 104 is connected to the conductive member 124. The conductive members 122, 124 may provide a differential input/output port of the cable 100 so that the differential data and/or power signals propagated through the wires 102, 104 can be input and/or output into and/or out of the cable 100. The connector 118 also includes a connector housing 126 that house the pair of conductive members 122, 124. The shield 114 and the jacket 116 are terminated and attached internally within the housing 126. The housing 126 further includes an insertable portion 128 that surrounds the conductive members 122, 124 and may be inserted into an antipodal connector (not explicitly shown) so that data and/or power differential signals may be input into and/or output out of the cable 100.

It should be noted that in this example, the connector 118 is a male differential connector since the pair of conductive members 122, 124 provide a male connection to input or output the data and/or power differential signals. In alternative embodiments, the connector 118 may be a female connector and thus include a pair of conductive channels configured to receive the male differential connector. In addition, in this embodiment of the cable 100, another connector, like the connector 118, is not provided at the other end 128 of the cable 100. Instead, a connection may be provided directly to the conductors 106, 108 at this end 128 of the cable 100. However, in alternative embodiments, another connector, like the connector 118, is connected at this end 128 of the cable 100.

Additional Uses

The polymer alloys disclosed herein are created by combining different polymers in such a way that physical and dielectric properties can be tuned to meet the requirements of the target application. The polymer alloys can be designed to exhibit both low loss and high mechanical properties, as well as high surface energy. These improved properties render these materials of choice for a number of electronics and electrical components, such as rigid, multi-layer low loss PCBs. For example, the polymer alloys disclosed herein are useful for laminating and insulating electrical components, such as PCBs. In some embodiments, the disclosed polymer alloys can be used as an adhesive layer, including, for example, as an adhesive layer in contact with a copper layer and a PFA layer. In some embodiments, the disclosed polymer alloys can be used as an adhesive layer between films such as, for example, a copper film and/or a PFA film. In some embodiments, the disclosed polymer alloys may be used as an adhesive layer in PCB applications, such as, for example, PCB laminates. In another embodiment, the polymer alloys disclosed herein are useful for battery encasements. The polymer alloys disclosed herein are in no way limited to the electronics industry, and can be extended to applications found in other industries, such as automotive, wire and cable, oil and gas, aerospace, 3D printing, and others.

In some embodiments a thin film of thermoplastic alloy (TPA) of FEP/PEI or PFA/PEI may be used as a laminate. In some embodiments, the TPA laminate may be used for printed circuit boards including, for example, high frequency circuit boards. In some embodiments, the TPA laminate may be extruded and/or be between about 5 µm and 200 µm thick. In some embodiments, TPA thin films may contain nano-size particles of fused silica, quarts, magnesium oxide and/or aluminum oxide. In some embodiments, the addition of inorganic particles may help reduce the dissipation factor and/or CTE. In some embodiments, the percentage of inorganic material is at least 1%.

In some embodiments, a filament of thermoplastic alloy of FEP/PEI and/or PFA/PEI may be used for 3D printing. In some embodiments a filament of TPA may be used for fused deposition modeling. In some embodiments, the filament may be at least 0.5 mm thick. While perfluoropolymers such as PFA and FEP present significant processing difficulty for 3D Printing using the filament deposition modeling (FDM) method, PEI is known to be useful for 3D printing by FDM. Without being bound by theory, this difference in processing and PEI's ability to be 3D printed using FDM is believed to be due to the difference in surface energy between PEI and PFA. PFA and FEP are known to have low surface energy which hinders the adhesion between successive layers of printed materials. In some embodiments, a thermoplastic alloy of PFA and PEI or a thermoplastic alloy of FEP and PEI will have higher surface energy than either PFA or FEP and be 3D printable using the FDM method.

In some embodiments, fiber of thermoplastic alloy of FEP/PEI and PFA/PEI may be extruded. In some embodiments, the fibers may include single strand or multi-strand fibers and/or combinations thereof. In some embodiments the extruded fibers may be included in woven and/or nonwoven substrates and/or used in conjunction with resins. In some embodiments, thermoplastic fibers may be incorporated into printed circuit board laminates. In some embodiments, thermoplastic fibers may be incorporated into printed circuit board laminates for use at greater than 1 GHz or for use at greater than 20 GHz, or for use at greater than 50 GHz. In some embodiments, printed circuit boards incorporating thermoplastic fibers may be used at frequencies as high as 79 GHz. In some embodiments, a thermoplastic alloy fiber may contain a nano-powder and/or micro-powder of copper and/or silver zeolite. In some embodiments, thermoplastic alloy fibers may be used for antimicrobial fabric.

In some embodiments, a fiber of thermoplastic alloy of FEP/PEI and PFA/PEI may be mixed with a binding polymer such as, for example, a thermoset resin, epoxy, thermoplastic polymer, polyester, vinyl ester, and/or nylon.

In some embodiments, a thermoplastic alloy may be extruded over copper wire to form a jacketing or insulation layer. The jacketing or insulation layer may include smooth surfaces or profile designs. In some embodiments, the resulting polymer insulated wires or cables may be used for automotive and/or aerospace applications. In some embodiments, the resulting polymer insulated wires or cables may be used for downhole or other oil and gas related applications.

In some embodiments, a thermoplastic alloy of FEP/PEI and/or PFA/PEI may be incorporated into antennas, antenna housing, radomes, and/or other related components for use in wireless communications such as, for example, 5G.

In some embodiments, a thermoplastic alloy of FEP/PEI and PFA/PEI may be injection molded. In some embodiments, thermoplastic alloys may be injection molded to form electrical connectors for use in, for example, electronics, vehicles, charging applications, wireless communications equipment, and/or optical connectors.

EXAMPLES

Example 1: Thin Films of FEP-PEI Blends

The following combination of polymers: a fully fluorinated FEP fluoropolymer having the properties set forth in Table 1 below, a functionalized fluorinated FEP fluoropolymer with end terminal groups, a polyetherimide (PEI), a functionalized polyetherimide with maleic anhydride end groups, and bis(oxazoline), was melt blended in a Leistritz ZSE-18 HP-PH twin screw extruder, with the temperature ramped from 280° C. to 320° C., and the compound was extruded into pellet form. Table 2 below shows the blend ratio of each of the polymers. The compounded polymer blend was melt extruded on a Brabender 1" single screw extruder through a flexible-lip film die to make a uniform (0.38 mm measure thickness) film.

TABLE 1

Properties of Fully Fluorinated FEP

| | | |
|---|---|---|
| Melt Flow Rate, g/10 min | ASTM D-1238 | 35-42 |
| Melting Point (DSC), ° C. | ASTM D-3418 | 255-265 |
| Tensile Strength, MPa, (minimum) | ASTM D-2116 | 18 |
| Elongation, %, (minimum) | ASTM D-2116 | 300 |
| MIT Flex, cycles, avg. | ASTM D-2176 | 3,000 |

TABLE 2

Thin films of FEP-PEI blends

| Blend Formula | Fully fluorinated FEP | Carboxylated FEP | FEP Blend | PEI | PEI (MAH) | 1,4-Bis(4,5-dihydro-2-oxazolyiThenzene |
|---|---|---|---|---|---|---|
| 256A | 90% | 10% | 90.00% | 10% | 0.0% | 0.00% |
| 256C | 90% | 10% | 93.90% | 5% | 1.0% | 0.10% |
| Control.: Fully fluorinated FEP | 100% | 0% | 0.00% | 0% | 0.0% | 0.00% |

FIGS. 1A-1D show various photographs of the surface of the pellets formed. As can be seen by FIGS. 1A-1D, the formed pellets showed improvement in pellet surface uniformity and smoothness when the pellets were formed from the polymer blends provided herein.

FIGS. 2A-2D show various photographs of the pellets formed from the control polymer (fully fluorinated FEP) and the FEP-PEI polymer blends provided herein. As can be seen from FIGS. 2B-2D, the pellets formed from the FEP-PEI polymer blends have uniform shapes.

Tensile Strength

The thin films of FEP-PEI blends shown in Table 1 were tested for tensile strength. The sample film was punched with a Lucris MA Series 3 press with an ASTM D638 Type V tensile bar die. The sample film was loaded into an Instron Universal Testing Machine using pneumatic grips to hold the sample. The distance between grips was set to 25.4 mm. The sample was tested at a rate of 50 mm/min until failure of the sample by breaking occurred. The tensile strength was measured by ASTM D638 Standard Test Method for Tensile Properties of Plastics. The results of the tensile strength testing are shown in Table 3 below.

TABLE 3

Results of Tensile Strength Testing

| Blend Formula | Tensile (MPa) |
|---|---|
| 256A | 17.25 |
| 256C | 27.54 |
| Control: Fully fluorinated FEP | 16.25 |

Figure 3:
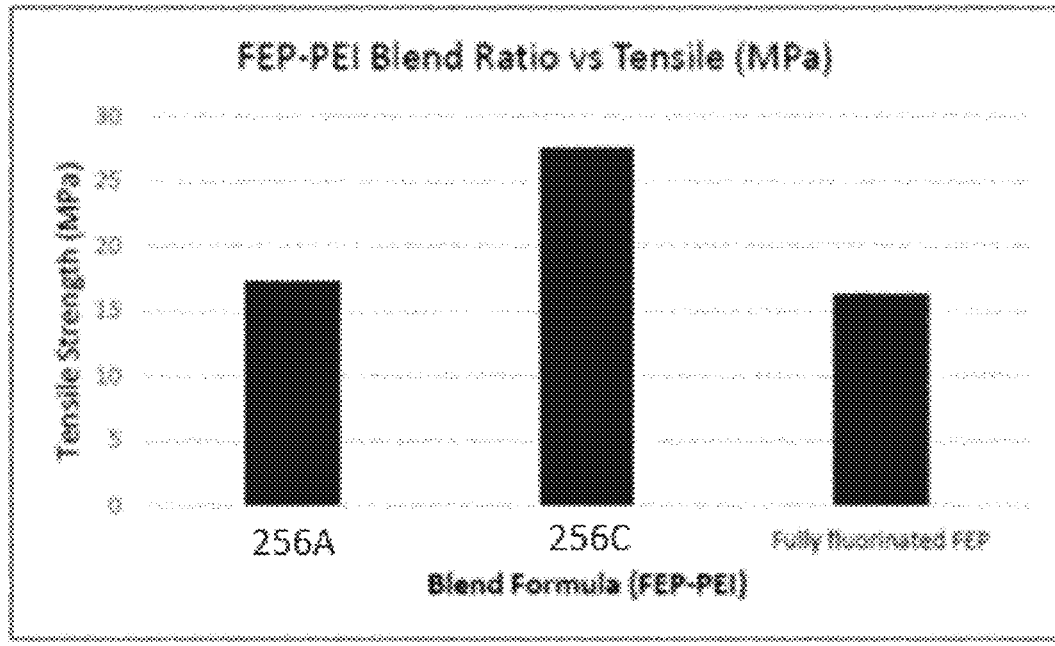
FIG. 3 is a bar graph showing the tensile strength of an embodiment of the disclosed polymer blends formed as a thin film and a FEP control.

As shown in Table 3 and FIG. 3, the thin film of the FEP-PEI blend including the functionalized polyetherimide and bis(oxazoline) compatibilizer (256C) showed an increase in tensile strength over the control and the FEP-PEI blend without the functionalized polyetherimide and bis(oxazoline) compatibilizer (256A).

Elongation

The thin films of FEP-PEI blends shown in Table 2 were tested for elongation. The sample film was punched with a Lucris MA Series 3 press with an ASTM D638 Type V tensile bar die. The sample film was loaded into an Instron Universal Testing Machine using pneumatic grips to hold the sample. The distance between grips was set to 25.4 mm. The sample was tested at a rate of 50 mm/min until failure of the sample by breaking occurred. Elongation was measured by ASTM D638 Standard Test Method for Tensile Properties of Plastics. The results of the elongation testing are shown in Table 4 below.

TABLE 4

Results of Elongation Testing

| Blend Formula | Elongation (%) |
|---|---|
| 256A | 171 |
| 256C | 18.7 |
| Control: Fully fluorinated FEP | 336 |

Figure 4:
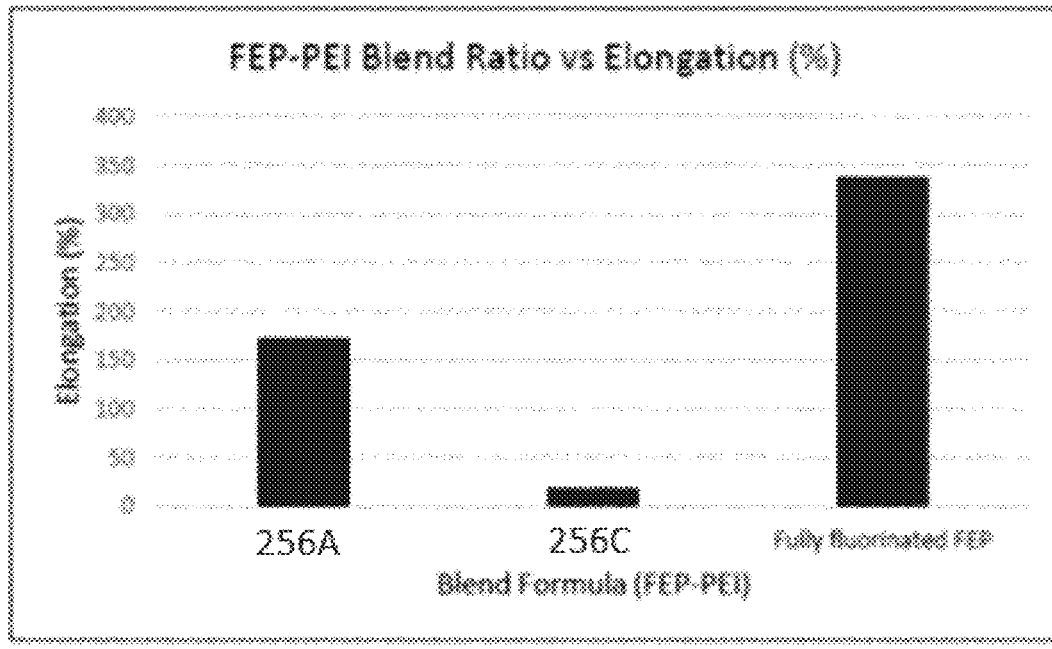
FIG. 4 is a bar graph showing the elongation percentage of an embodiment of the disclosed polymer blends formed as a thin film and a FEP control.

As shown in Table 4 and FIG. 4, the thin film of the FEP-PEI blend including the functionalized polyetherimide and bis(oxazoline) compatibilizer (256C) showed a significant decrease in elongation when compared to the control. The 256C blend also showed a decrease in elongation when compared to the FEP-PEI blend without the functionalized polyetherimide and bis(oxazoline) compatibilizer (256A).

Modulus

The thin films of FEP-PEI blends shown in Table 2 underwent modulus testing. The sample film was punched with a Lucris MA Series 3 press with an ASTM D638 Type V tensile bar die. The sample film was loaded into an Instron Universal Testing Machine using pneumatic grips to hold the sample. The distance between grips was set to 25.4 mm. The sample was tested at a rate of 50 mm/min until failure of the sample by breaking occurred. Modulus was measured by ASTM D638 Standard Test Method for Tensile Properties of Plastics. The results of the modulus testing are shown in Table 5 below.

TABLE 5

Results of Modulus Testing

| Blend Formula | Modulus (MPa) |
|---|---|
| 256A | 606 |
| 256C | 898 |
| Control: Fully fluorinated FEP | 373 |

Figure 5:
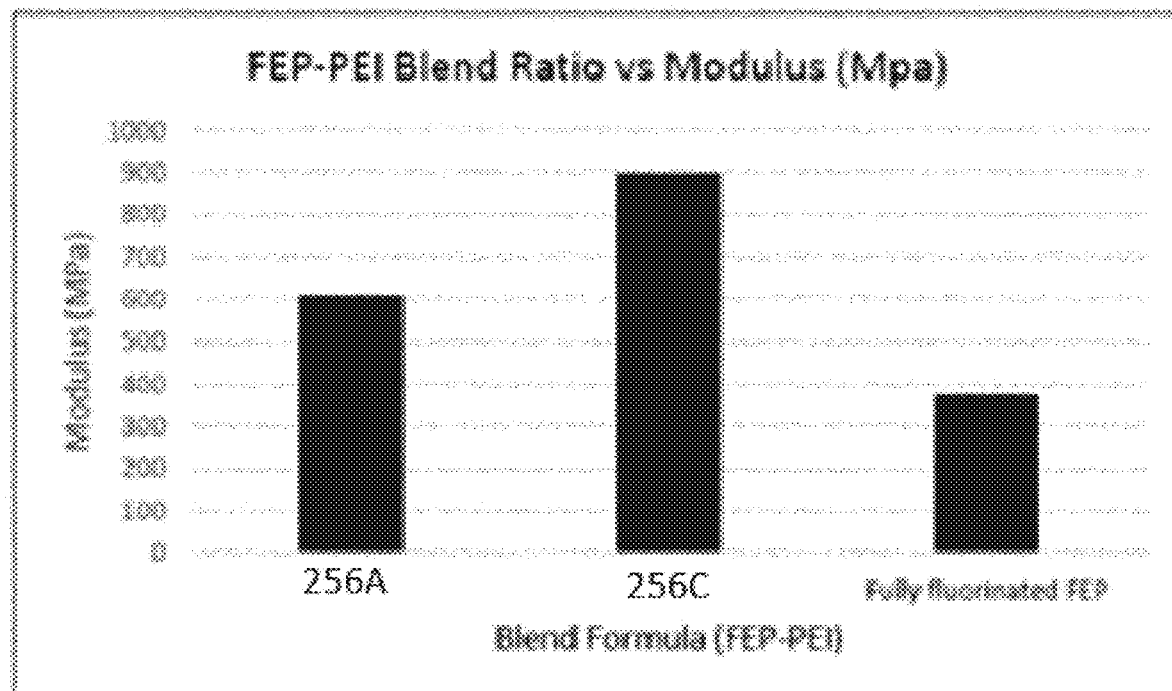
FIG. 5 is a bar graph showing the Young's modulus of an embodiment of the disclosed polymer blends formed as a thin film and a FEP control.

As shown in Table 5 and FIG. 5, the thin film of the FEP-PEI blend including the functionalized polyetherimide and bis(oxazoline) compatibilizer (256C) showed an increase of 2.4 times in modulus when compared to the control. The 256C blend also showed an increase in modulus when compared to the FEP-PEI blend without the functionalized polyetherimide and bis(oxazoline) compatibilizer (256A).

Yield Strength

The thin films of FEP-PEI blends shown in Table 2 were tested for yield strength. The sample film was punched with a Lucris MA Series 3 press with an ASTM D638 Type V tensile bar die. The sample film was loaded into an Instron Universal Testing Machine using pneumatic grips to hold the sample. The distance between grips was set to 25.4 mm. The sample was tested at a rate of 50 mm/min until failure of the sample by breaking occurred. Yield strength was measured by ASTM D638 Standard Test Method for Tensile Properties of Plastics. The results of the yield strength testing are shown in Table 6 below.

TABLE 6

Results of Yield Strength Testing

| Blend Formula | Yield |
|---|---|
| 256A | 16.43 |
| 256C | 13.97 |
| Control: Fully fluorinated FEP | 16.14 |

Dielectric Constant

The thin films of FEP-PEI blends shown in Table 2 were tested for dielectric constant. The results of the dielectric constant testing are shown in Table 6 below.

TABLE 7

Dielectric Constant of FEP:PEI Blend

| Blend Formula | Dielectric Constant ($D_k$) |
|---|---|
| 256C | 2.36 |
| Fully fluorinated FEP | 2.17 |

Figure 6:
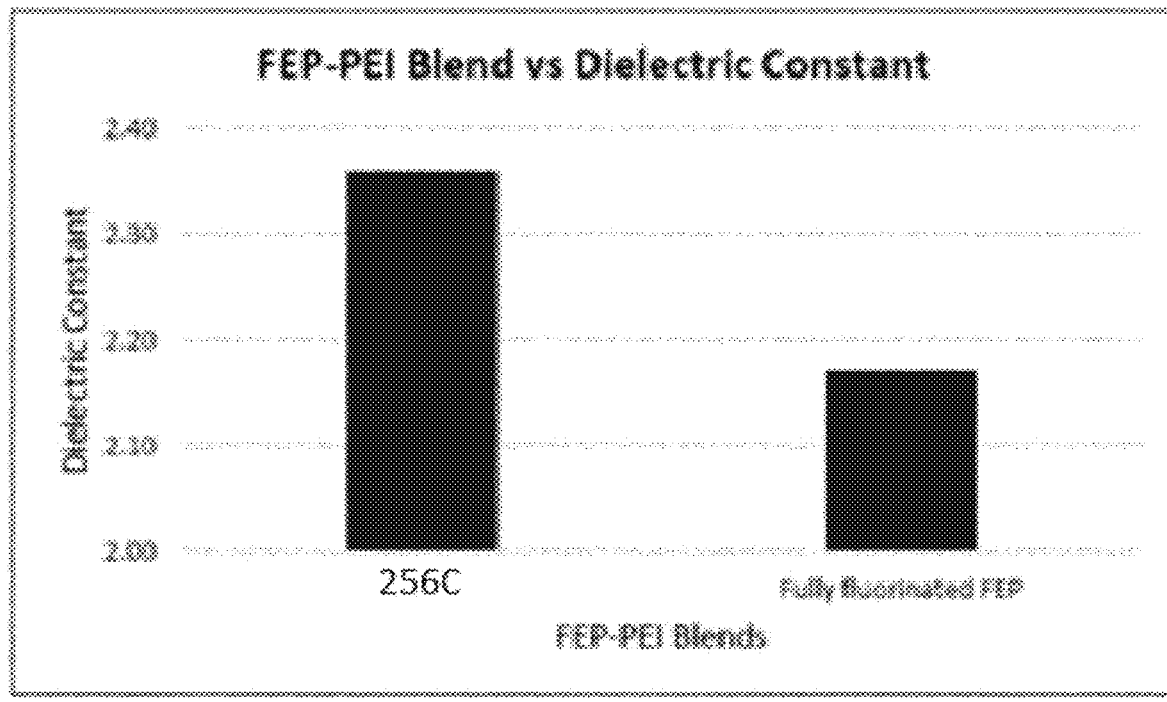
FIG. 6 is a bar graph showing the dielectric constant of an embodiment of the disclosed polymer blends formed as a thin film and a FEP control.

As can be seen in Table 7 and FIG. 6, a slight increase in dielectric constant was observed with the addition of PEI. PEI has a dielectric constant of 3.2. The addition of 6% PEI to the FEP only raised the dielectric constant from 2.17 to 2.36.

Example 2: Injection Molded Parts of FEP-PEI Blends (First Run)

Various combinations of polymers including a fully fluorinated FEP fluoropolymer having the properties set forth in Table 1 above, a functionalized fluorinated FEP fluoropolymer with end terminal groups, a polyetherimide, a functionalized polyetherimide with maleic anhydride end groups, and bis(oxazoline), were melt blended in a Leistritz ZSE-18 HP-PH twin screw extruder and the compound was extruded into pellet form. Table 8 below shows the composition of the various blends and the blend ratio of each of the polymers. Each compound was then injection molded, using a Sumitomo SE75DU injection molding machine, into ASTM D638 Type V tensile bars using a temperature profile of 300° C. to 400° C.

TABLE 8

Injection Molded parts (first run) of FEP-PEI blends

| | FEP Blends | | Full Blend Formulation | | | |
|---|---|---|---|---|---|---|
| Formula | Fully Fluorinated FEP | Carboxylated FEP | FEP Blend | PEI | PEI-MAH | 1,4-Bis(4,5-dihydro-2-oxazolyl)Benzene) |
| 236A | 90% | 10% | 99.90% | 0% | 0.00% | 0.10% |
| 236B | 90% | 10% | 94.90% | 5% | 0.00% | 0.10% |
| 236C | 90% | 10% | 93.90% | 5% | 1.00% | 0.10% |
| 236D | 90% | 10% | 94.40% | 5% | 0.50% | 0.10% |
| 236E | 90% | 10% | 94.80% | 5% | 0.10% | 0.10% |
| 244A | 60% | 40% | 93.90% | 5% | 1.00% | 0.10% |
| Fully fluorinated FEP | 100% | 0% | 100.00% | 0% | 0.00% | 0.00% |

Tensile Strength

The injection molded parts of FEP-PEI blends shown in Table 8 were tested for tensile strength. The sample part was punched with a Lucris MA Series 3 press with an ASTM D638 Type V tensile bar die. The sample part was loaded into an Instron Universal Testing Machine using pneumatic grips to hold the sample. The distance between grips was set to 25.4 mm. The sample was tested at a rate of 50 mm/min until failure of the sample by breaking occurred. Tensile strength was measured by ASTM D638 Standard Test Method for Tensile Properties of Plastics. The results of the tensile strength testing are shown in Table 9 below.

TABLE 9

Results of Tensile Strength Testing

| | Max Tensile Strength (MPa) | |
|---|---|---|
| Blend Formula | Average | Std Dev |
| 236B | 20.50 | 0.22 |
| 236C | 27.55 | 0.51 |
| 236E | 19.67 | 0.60 |
| 244A | 18.88 | 0.26 |
| Fully fluorinated FEP | 18.59 | 0.32 |

Figure 7:
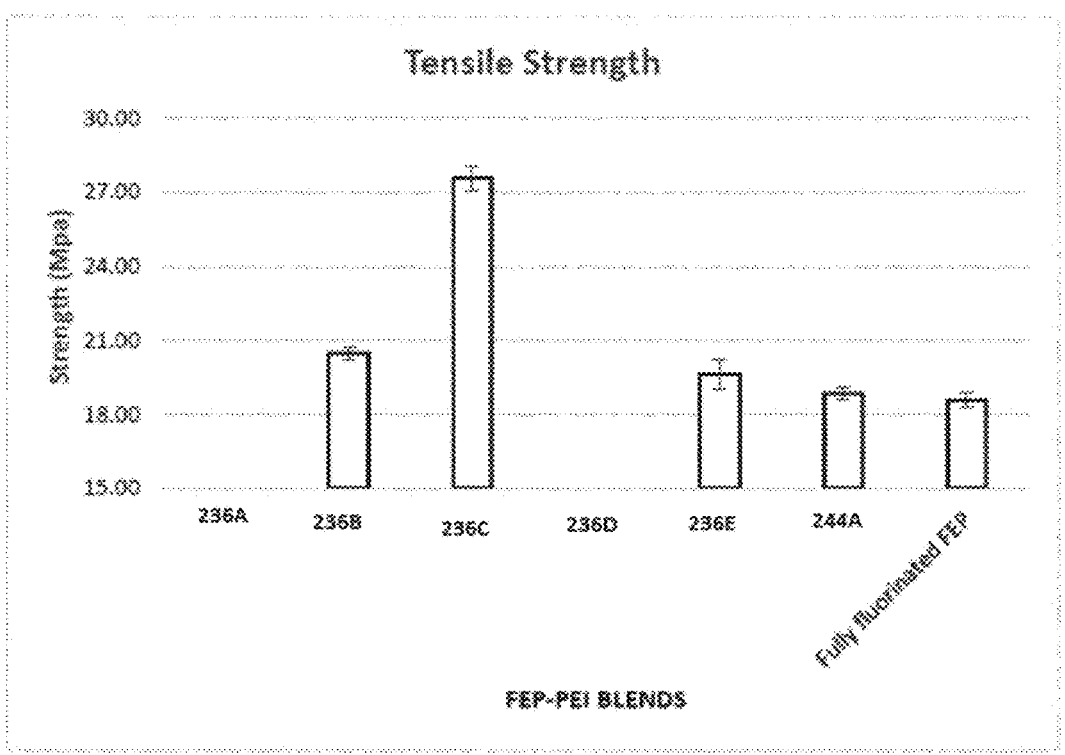
FIG. 7 is a bar graph showing the tensile strength of an embodiment of the disclosed polymer blends formed as injection molded parts during a first run and a FEP control.

As shown in Table 9 and FIG. 7, the FEP-PEI blend (236C) having 5% PEI, 1.0% PEI-MAH, and 0.1% bis (oxazoline) as a compatibilizer showed nearly a 40% increase in tensile strength over the control.

Young's Modulus

The injection molded parts of FEP-PEI blends shown in Table 8 were tested for Young's modulus. The sample part was punched with a Lucris MA Series 3 press with an ASTM D638 Type V tensile bar die. The sample part was loaded into an Instron Universal Testing Machine using pneumatic grips to hold the sample. The distance between grips was set to 25.4 mm. The sample was tested at a rate of 50 mm/min until failure of the sample by breaking occurred. Young's modulus was measured by ASTM D638 Standard Test Method for Tensile Properties of Plastics. The results of the Young's modulus testing are shown in Table 10 below.

TABLE 10

Results of Young's Modulus Testing

| | Young Modulus (MPa) | |
|---|---|---|
| Blend Formula | Average | Std Dev |
| 236A | | |
| 236B | 453.11 | 29.23 |
| 236C | 635.88 | 18.91 |
| 236D | | |
| 236E | 418.28 | 31.06 |
| 244A | 443.12 | 17.86 |
| Fully fluorinated FEP | 397.19 | 20.39 |

Figure 8:
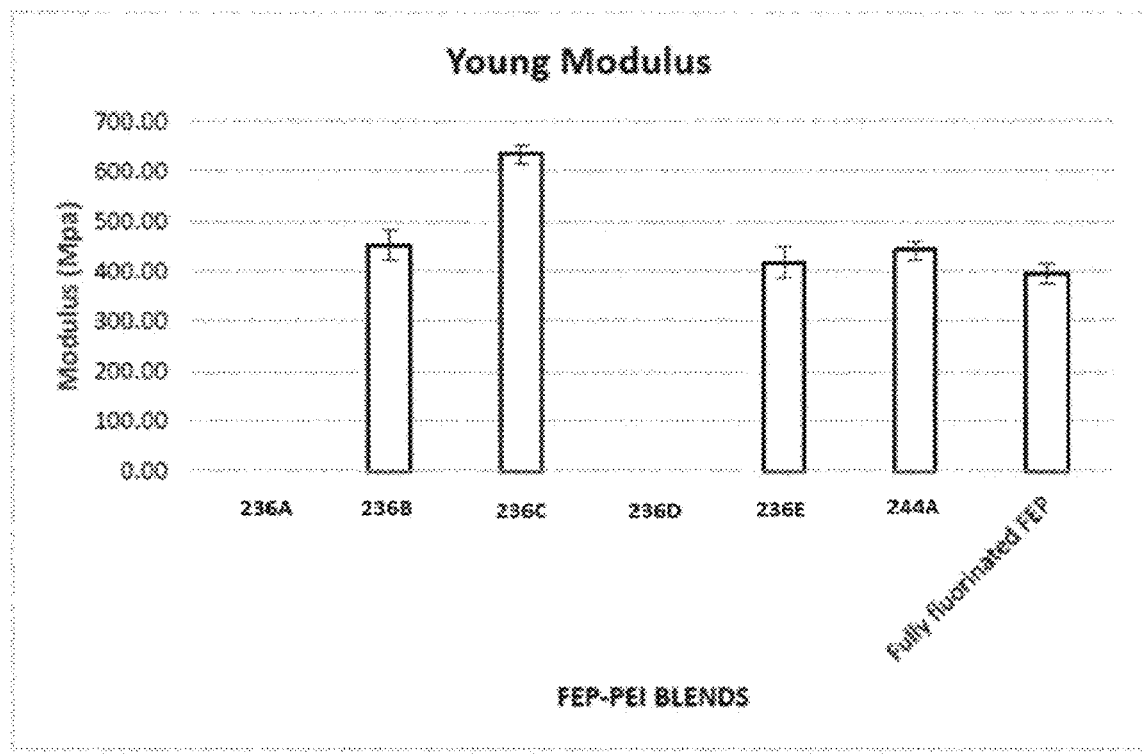
FIG. 8 is a bar graph showing the Young's modulus of an embodiment of the disclosed polymer blends formed as injection molded parts during a first run and a FEP control.

As shown in Table 10 and FIG. 8, the FEP-PEI blend (236C) having 5% PEI, 1.0% PEI-MAH, and 0.1% bis (oxazoline) as a compatibilizer showed nearly a 60% increase in Young's modulus when compared to the control.

Elongation at Break

The injection molded parts of FEP-PEI blends shown in Table 8 were tested for elongation at break. The sample part was punched with a Lucris MA Series 3 press with an ASTM D638 Type V tensile bar die. The sample part was loaded into an Instron Universal Testing Machine using pneumatic grips to hold the sample. The distance between grips was set to 25.4 mm. The sample was tested at a rate of 50 mm/min until failure of the sample by breaking occurred. Elongation at break was measured by ASTM D638 Standard Test Method for Tensile Properties of Plastics. The results of the elongation at break testing are shown in Table 11 below.

TABLE 11

Results of Elongation at Break Testing

| | Elongation at Break | |
|---|---|---|
| Blend Formula | Average | Std Dev |
| 236A | | |
| 236B | 166.20 | 54.63 |
| 236C | 18.35 | 10.02 |
| 236D | | |
| 236E | 79.20 | 26.61 |
| 244A | 173.93 | 15.31 |
| Fully fluorinated FEP | 189.60 | 3.71 |

Figure 9:
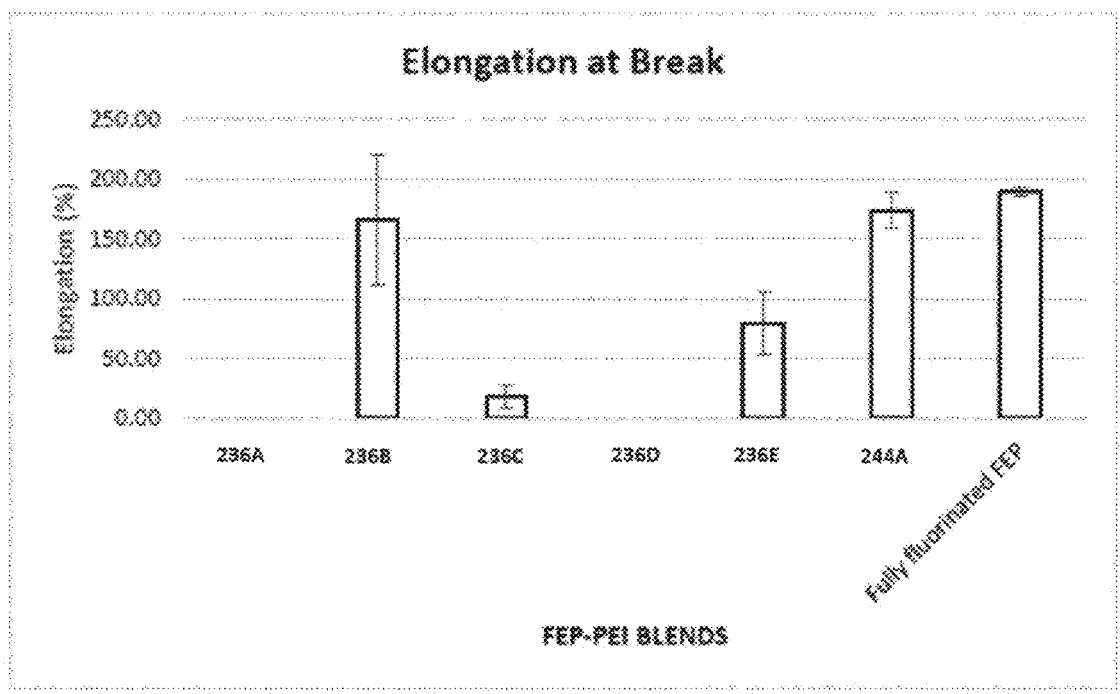
FIG. 9 is a bar graph showing the elongation at break of an embodiment of the disclosed polymer blends formed as injection molded parts during a first run and a FEP control.

As shown in Table 11 and FIG. 9, the FEP-PEI blend (236C) having 5% PEI, 1.0% PEI-MAH, and 0.1% Bis (oxazoline) as a compatibilizer showed a significant decrease in elongation at break when compared to the control.

Yield Strength

The injection molded parts of FEP-PEI blends shown in Table 8 were tested for yield strength. The sample part was punched with a Lucris MA Series 3 press with an ASTM D638 Type V tensile bar die. The sample part was loaded into an Instron Universal Testing Machine using pneumatic grips to hold the sample. The distance between grips was set to 25.4 mm. The sample was tested at a rate of 50 mm/min until failure of the sample by breaking occurred. Yield strength was measured by ASTM D638 Standard Test Method for Tensile Properties of Plastics. The results of the yield strength testing are shown in Table 12 below.

TABLE 12

Results of Yield Strength Testing

| | Yield Strength (MPa) | |
|---|---|---|
| Blend Formula | Average | Std Dev |
| 236B | 17.55 | 0.60 |
| 236C | 26.45 | 1.67 |
| 236E | 17.28 | 1.01 |
| 244A | 17.15 | 0.36 |
| Fully fluorinated FEP | 15.25 | 0.29 |

Figure 10:
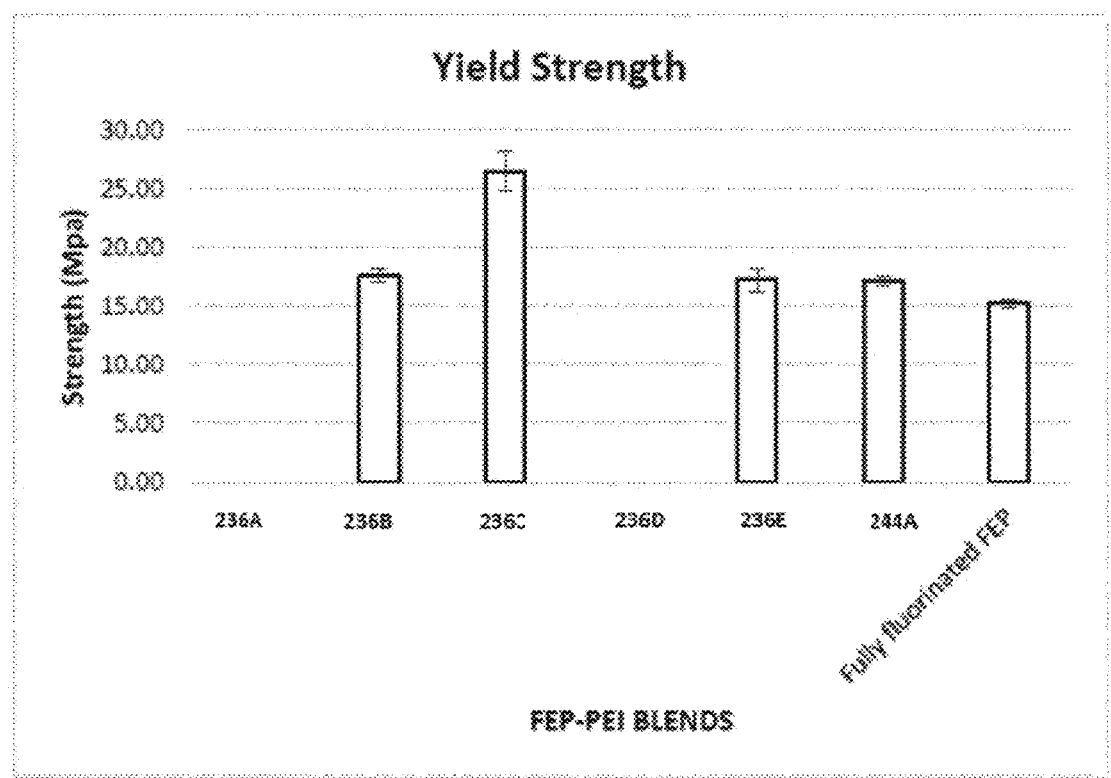
FIG. 10 is a bar graph showing the yield strength of an embodiment of the disclosed polymer blends formed as injection molded parts during a first run and a FEP control.

As shown in Table 12 and FIG. 10, the FEP-PEI blend (236C) having 5% PEI, 1.0% PEI-MAH, and 0.1% bis (oxazoline) as a compatibilizer showed an 80% increase in yield strength when compared to the control.

Example 3: Injection Molded Parts of FEP-PEI Blends (Second Run)

Various combinations of polymers including a fully fluorinated FEP fluoropolymer having the properties set forth in Table 1 above, a functionalized fluorinated FEP fluoropolymer with end terminal groups, a polyetherimide, a functionalized polyetherimide with maleic anhydride end groups, and bis(oxazoline), were melt blended in a Leistritz ZSE-18 HP-PH twin screw extruder and the compound was extruded into pellet form. Each compound was then injection molded, using a Sumitomo SE75DU injection molding machine, into ASTM D638 Type V tensile bars using a temperature profile of 300° C. to 400° C. Table 13 below shows the composition of the various blends and the blend ratio of each of the polymers for the second run.

TABLE 13

Injection Molded parts (second run) of FEP-PEI blends

| | FEP Blends | | Full Blend Formulation | | | |
|---|---|---|---|---|---|---|
| Formula | Fully Fluorinated FEP | Carboxylated FEP | FEP Blend | PEI | PEI-MAH | 1,4-Bis(4,5-dihydro-2-oxazolyl)Benzene) |
| PEI | | | | 100% | | |
| 121C | 84.50% | 9.39% | 93.90% | 5% | 1.00% | 0.10% |
| 121D | 71.60% | 17.90% | 89.50% | 8% | 2.00% | 0.50% |
| 121E | 0% | 9.95% | 9.95% | 87.56% | 1.99% | 0.50% |
| Fully fluorinated FEP | 100% | | | | | |

Tensile Strength

The injection molded parts of FEP-PEI blends shown in Table 13 were tested for tensile strength. The sample part was punched with a Lucris MA Series 3 press with an ASTM D638 Type V tensile bar die. The sample part was loaded into an Instron Universal Testing Machine using pneumatic grips to hold the sample. The distance between grips was set to 25.4 mm. The sample was tested at a rate of 50 mm/min until failure of the sample by breaking occurred. Tensile strength was measured by ASTM D638 Standard Test Method for Tensile Properties of Plastics. The results of the tensile strength testing are shown in Table 14 below.

TABLE 14

Results of Tensile Strength Testing (Second Run)

| | Max Tensile Strength (MPa) | |
|---|---|---|
| Blend Formula | Average | Std Dev |
| PEI | 110.74 | 1.09 |
| 121C | 20.27 | 0.07 |
| 121D | 27.49 | 0.52 |
| 121E | 103.34 | 4.10 |
| Fully fluorinated FEP | 18.59 | 0.32 |

Figure 11:
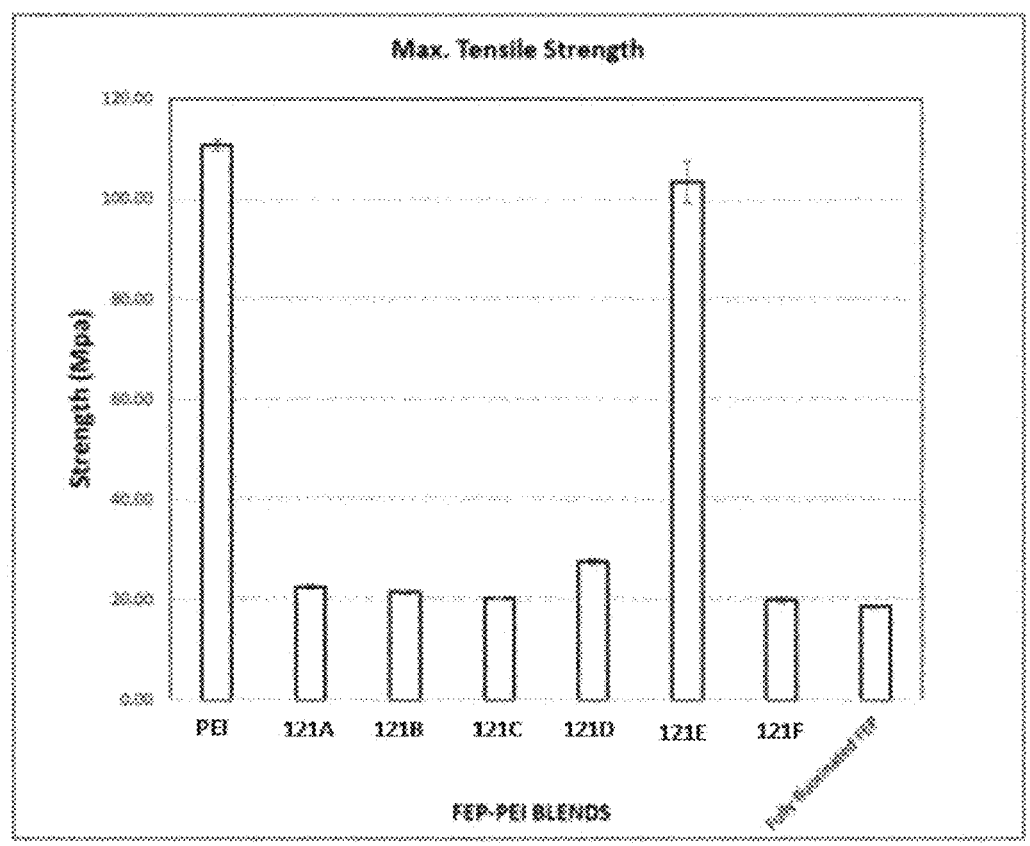
FIG. 11 is a bar graph showing the tensile strength of an embodiment of the disclosed polymer blends formed as injection molded parts during a second run and a FEP control.

As shown in Table 14 and FIG. 11, the FEP-PEI blend having a majority of the FEP blend (121D; 90:10 FEP:PEI) showed a 48% increase in tensile strength. However, in a majority PEI blend (Sample 121E; 90:10 PEI:FEP) the tensile strength was similar (only 6% lower) to pure fully fluorinated FEP.

Young's Modulus

The injection molded parts of FEP-PEI blends shown in Table 13 were tested for Young's modulus. The sample part was punched with a Lucris MA Series 3 press with an ASTM D638 Type V tensile bar die. The sample part was loaded into an Instron Universal Testing Machine using pneumatic grips to hold the sample. The distance between grips was set to 25.4 mm. The sample was tested at a rate of 50 mm/min until failure of the sample by breaking occurred. Young's modulus was measured by ASTM D638 Standard Test Method for Tensile Properties of Plastics. The results of the Young's modulus testing are shown in Table 15 below.

TABLE 15

Results of Young's Modulus Testing (Second Run)

| | Young Modulus (MPa) | |
|---|---|---|
| Blend Formula | Average | Std Dev |
| PEI | 1343.43 | 56.10 |
| 121C | 453.83 | 78.78 |
| 121D | 561.24 | 91.06 |
| 121E | 1388.12 | 140.47 |
| Fully fluorinated FEP | 397.19 | 20.39 |

Figure 12:
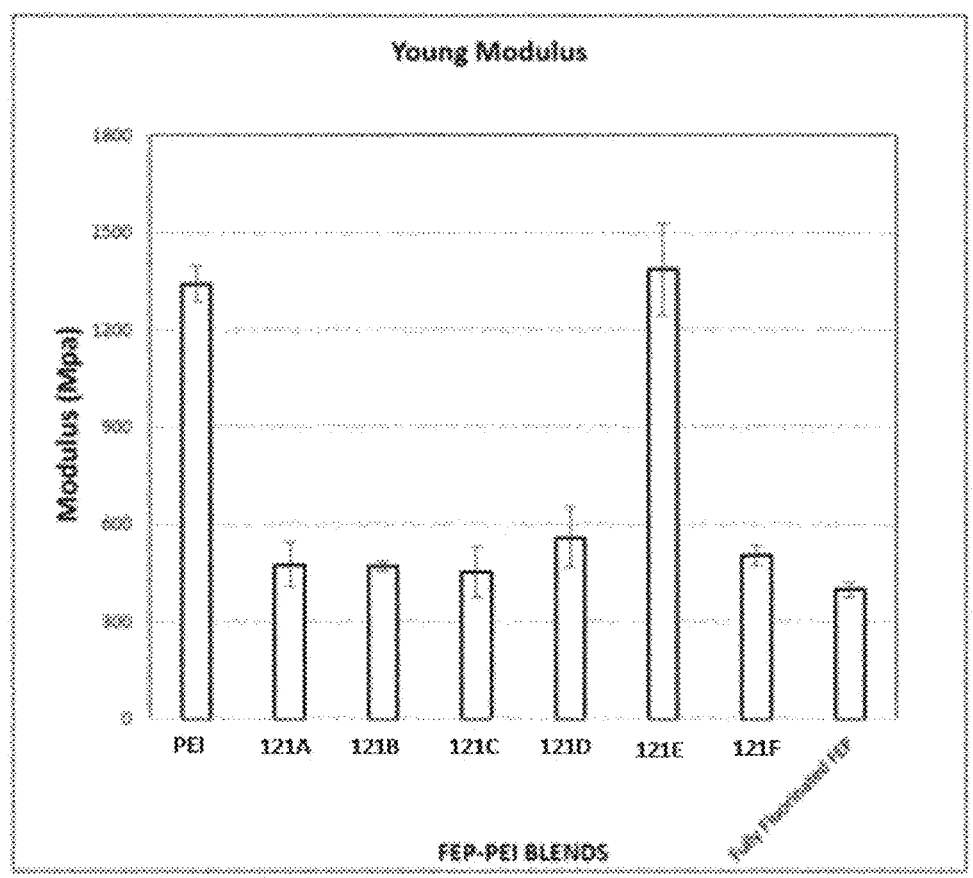
FIG. 12 is a bar graph showing the Young's modulus of an embodiment of the disclosed polymer blends formed as injection molded parts during a second run and a FEP control.

As shown in Table 15 and FIG. 12, the FEP-PEI blend having a majority of the FEP blend (121D; 90:10 FEP:PEI) showed a 41% increase in Young's modulus when compared to the control. However, in a majority PEI blend (Sample 121E; 90:10 PEI:FEP), a slight increase of 3% was measured compared to pure fully fluorinated FEP.

Elongation at Break

The injection molded parts of FEP-PEI blends shown in Table 13 were tested for elongation at break. The sample part was punched with a Lucris MA Series 3 press with an ASTM D638 Type V tensile bar die. The sample part was loaded into an Instron Universal Testing Machine using pneumatic grips to hold the sample. The distance between grips was set to 25.4 mm. The sample was tested at a rate of 50 mm/min until failure of the sample by breaking occurred. Elongation at break was measured by ASTM D638 Standard Test Method for Tensile Properties of Plastics. The results of the elongation at break testing are shown in Table 16 below.

TABLE 16

Results of Elongation at Break Testing (Second Run)

| | Elongation at Break (%) | |
|---|---|---|
| Blend Formula | Average | Std Dev |
| PEI | 39% | 0.16 |
| 3121C | 36% | 0.03 |
| 3121D | 25% | 0.05 |
| 3121E | 32% | 0.09 |
| Fully fluorinated FEP | 189.60% | 0.04 |

Figure 13:
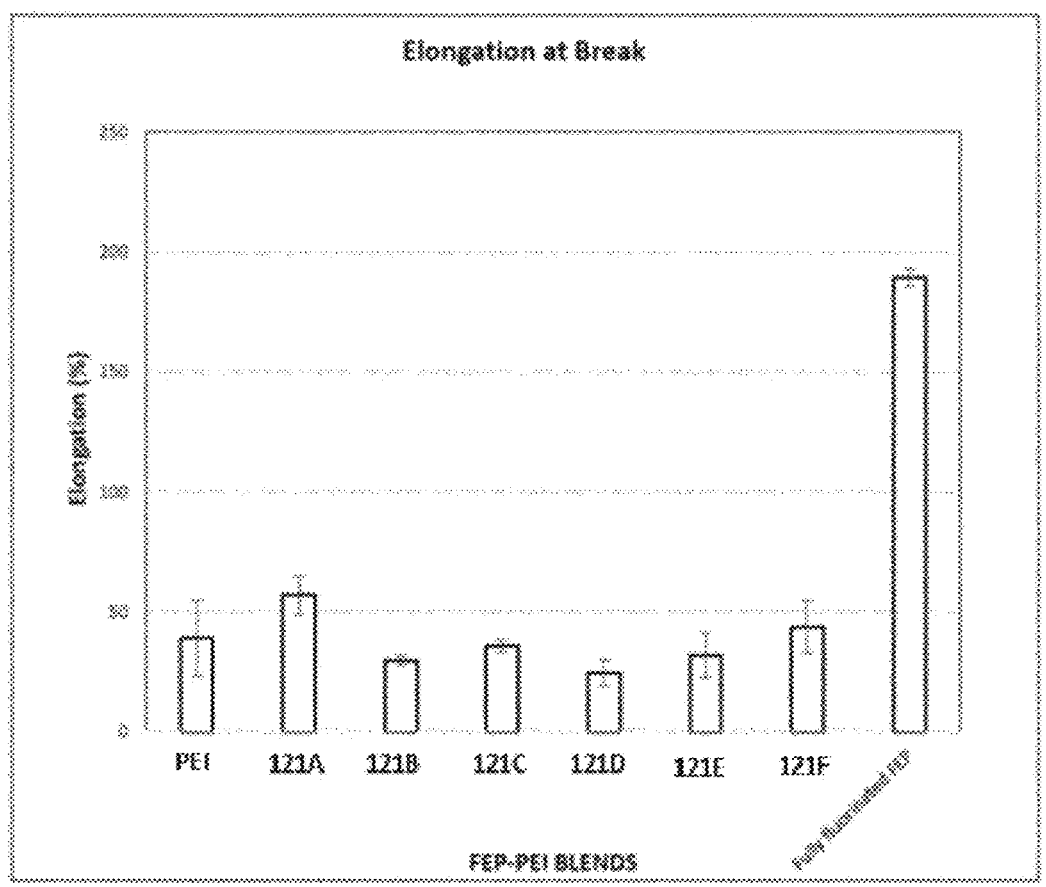
FIG. 13 is a bar graph showing the elongation at break of an embodiment of the disclosed polymer blends formed as injection molded parts during a second run and a FEP control.

As shown in Table 16 and FIG. 13, the FEP-PEI blend having a majority of the FEP blend (121D; 90:10 FEP:PEI) showed a significant decrease in elongation compared to pure PEI. In a majority PEI blend (Sample 121E; 90:10 PEI:FEP), the percent elongation was 31% which is about the same as pure PEI.

Yield Strength

The injection molded parts of FEP-PEI blends shown in Table 13 were tested for yield strength. The sample part was punched with a Lucris MA Series 3 press with an ASTM D638 Type V tensile bar die. The sample part was loaded into an Instron Universal Testing Machine using pneumatic grips to hold the sample. The distance between grips was set to 25.4 mm. The sample was tested at a rate of 50 mm/min until failure of the sample by breaking occurred. Yield strength was measured by ASTM D638 Standard Test Method for Tensile Properties of Plastics. The results of the yield strength testing are shown in Table 17 below.

TABLE 17

Results of Yield Strength Testing (Second Run)

| Blend Formula | Yield Strength (MPa) | |
|---|---|---|
| | Average | Std Dev |
| PEI | 44.92 | 2.57 |
| 121C | 15.25 | 1.19 |
| 121D | 23.74 | 1.58 |
| 121E | 61.46 | 5.21 |
| Fully fluorinated FEP | 15.25 | 0.29 |

Figure 14:
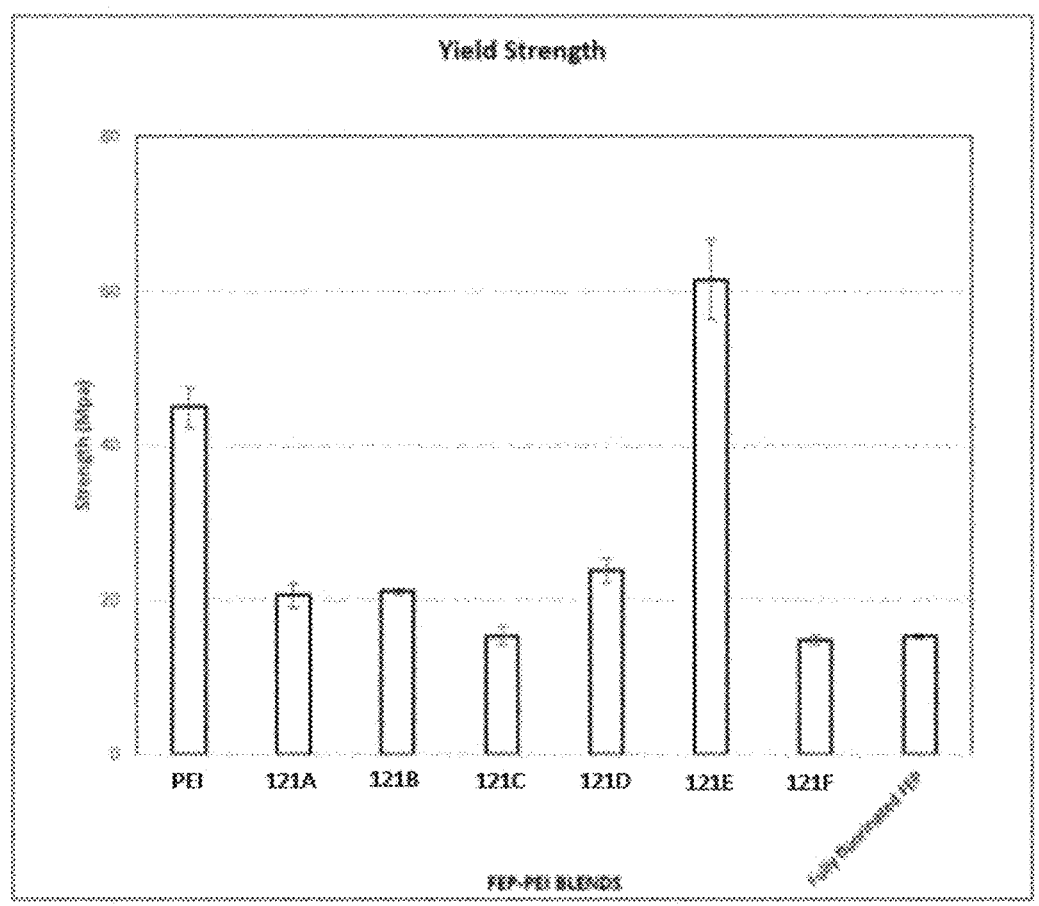
FIG. 14 is a bar graph showing the yield strength of an embodiment of the disclosed polymer blends formed as injection molded parts during a second run and a FEP control.

As shown in Table 17 and FIG. 14, the FEP-PEI blend with a majority of the FEP blend (Sample 121D; 90:10 FEP:PEI) showed a significant increase in Yield Strength compared to pure fully fluorinated FEP.

Example 4: Weight Retention of Polymer Blends

Figure 15:
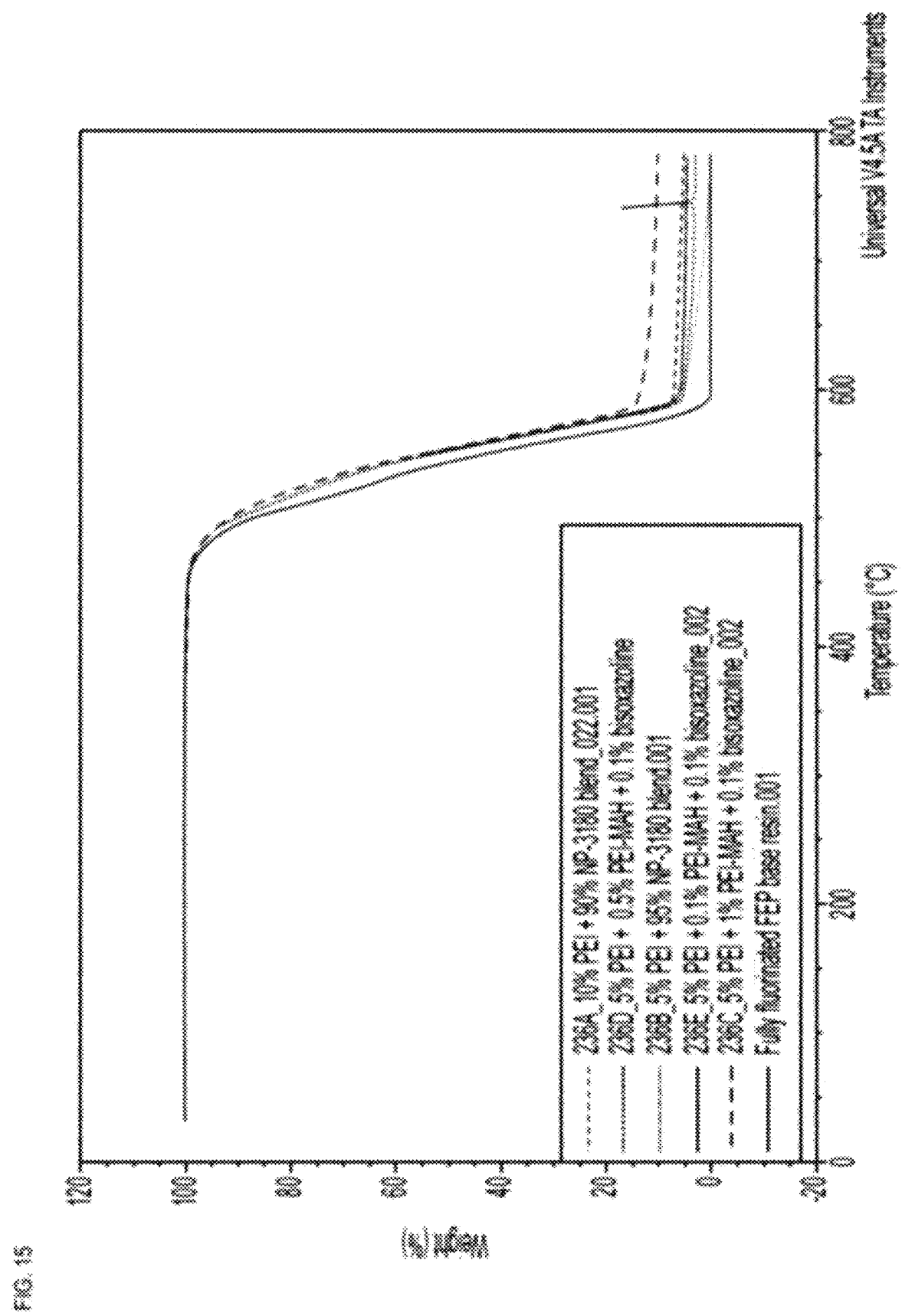
FIG. 15 is a graph showing the weight retention of various embodiments of the disclosed polymer blends over a temperature range of 0° C. to 800° C.
Figure 10:
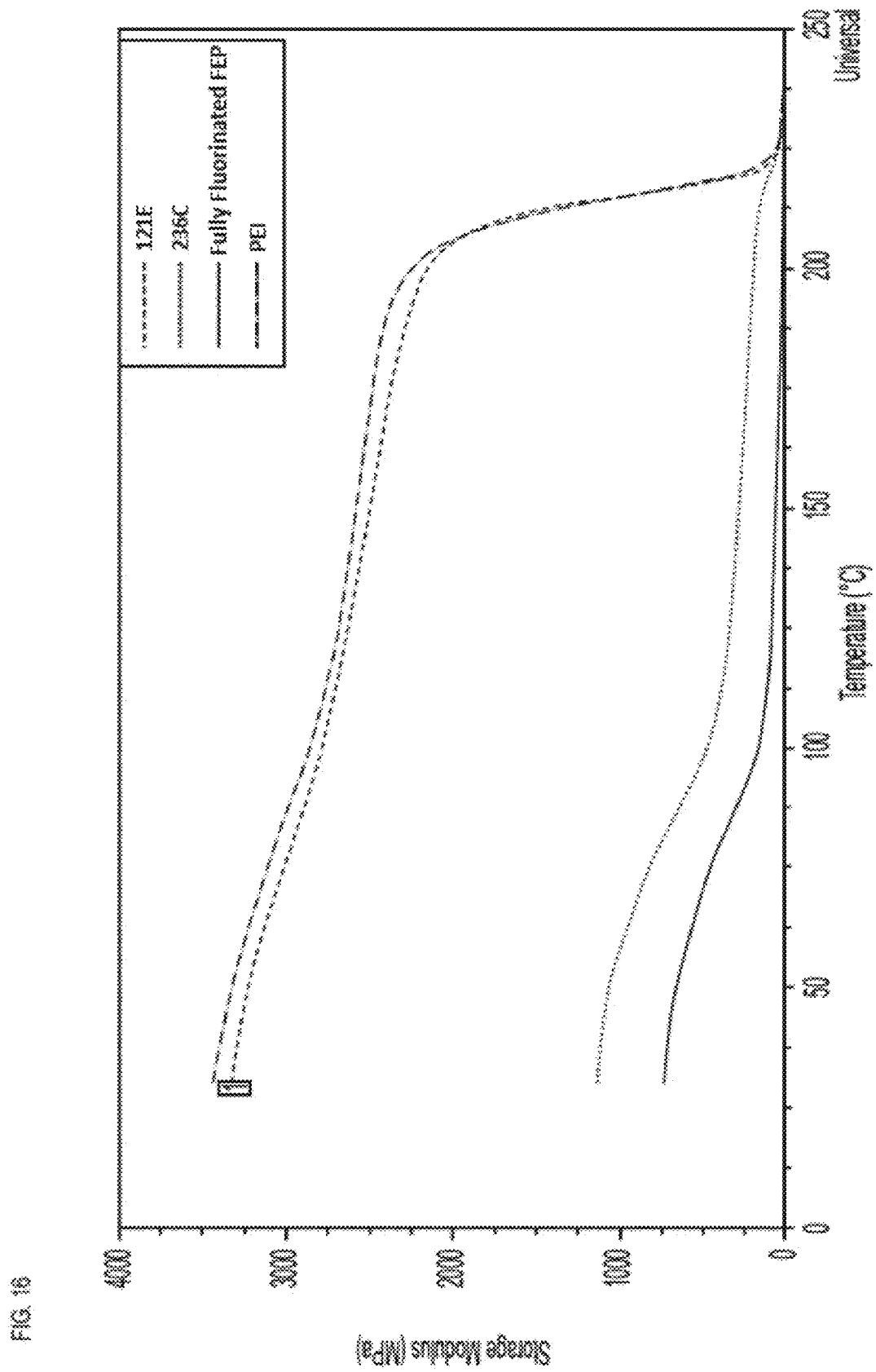

FIG. 15 shows a graph of the weight retention of various polymer blends over a temperature range of 0° C. to 800° C. As can be seen in FIG. 15, the blend containing FEP, carboxylic functional FEP, PEI, PEI-MAH, and bis(oxazoline) showed an 18% weight retention at 800° C. while the pure FEP and the other blends that do not contain all five components fully degrade.

Example 5: Storage Modulus of Polymer Blends

FIG. 16 shows a graph of the storage modulus (MPa) of various polymer blends over a temperature range of 0° C. to 250° C. As can be seen in FIG. 16, Dynamic Mechanic Analysis (DMA) of an injected molded FEP-PEI blend having a majority of FEP blend (Sample 236C; 94%:6% FEP:PEI) showed a significant increase in storage modulus from 750 MPa to 1250 MPa when compared to pure fully fluorinated FEP. In a majority PEI blend (Sample 121E; 90:10 PEI:FEP), storage modulus was similar to pure PEI.

Example 6: Additional Thin Films of FEP-PEI Blends

[715A] Experiment 1: The following combination of polymers was weighed independently and then mixed together in a polyethylene bag: 150 grams of carboxylated functional FEP fluoropolymer, 975 grams of PFA, and 195 grams of a polyimide (PI), resulting in a total mixture weight of 1320 grams. After mixing, the combination of polymers was melt blended in a Leistritz ZSE-18 HP-PH twin screw extruder, with the temperature ramped from 280° C. to 320° C., and the compound was extruded into pellet form. The compounded polymer blend was melt extruded on a Brabender 1" single screw extruder through a flexible-lip film die to make a uniform (0.38 mm measure thickness) film.

The polyimide (PI) used in Examples 6 and 7 may include a melt processable polyimide, or non-melt processable polyimide. In some embodiments, the PI may include a thermoplastic polyimide (TPI), a thermoset polyimide (TSPI) and/or a poly(amic acid).

[715B] Experiment 2: The following combination of polymers was weighed independently and then mixed together in a polyethylene bag: 150 grams of carboxylated functional FEP fluoropolymer, 975 grams of PFA, 195 grams of a thermoplastic polyimide (TPI), and 1.3 grams of bis(oxazoline), resulting in a total mixture weight of 1321 grams. After mixing, the combination of polymers was melt blended in a Leistritz ZSE-18 HP-PH twin screw extruder, with the temperature ramped from 280° C. to 320° C., and the compound was extruded into pellet form. The compounded polymer blend was melt extruded on a Brabender 1" single screw extruder through a flexible-lip film die to make a uniform (0.38 mm measure thickness) film.

[715C] Experiment 3: The following combination of polymers was weighed independently and then mixed together in a polyethylene bag: 150 grams of carboxylated functional FEP fluoropolymer, 975 grams of PFA, 195 grams of a thermoplastic polyimide (TPI), and 13 grams of bis(oxazoline), resulting in a total mixture weight of 1333 grams. After mixing, the combination of polymers was melt blended in a Leistritz ZSE-18 HP-PH twin screw extruder, with the temperature ramped from 280° C. to 320° C., and the compound was extruded into pellet form. The compounded polymer blend was melt extruded on a Brabender 1" single screw extruder through a flexible-lip film die to make a uniform (0.38 mm measure thickness) film.

[715D] Experiment 4: The following combination of polymers was weighed independently and then mixed together in a polyethylene bag: 150 grams of carboxylated functional FEP fluoropolymer, 975 grams of PFA, 195 grams of a thermoplastic polyimide (TPI), 39 grams of a functionalized polyetherimide with carboxylic end groups, and 1.3 grams of bis(oxazoline), resulting in a total mixture weight of 1360 grams. After mixing, the combination of polymers was melt blended in a Leistritz ZSE-18 HP-PH twin screw extruder, with the temperature ramped from 280° C. to 320° C., and the compound was extruded into pellet form. The compounded polymer blend was melt extruded on a Brabender 1" single screw extruder through a flexible-lip film die to make a uniform (0.38 mm measure thickness) film.

[715E] Experiment 5: The following combination of polymers was weighed independently and then mixed together in a polyethylene bag: 150 grams of carboxylated functional FEP fluoropolymer, 975 grams of PFA, 195 grams of a thermoplastic polyimide (TPI), 39 grams of a functionalized polyetherimide with carboxylic acid end groups, and 13 grams of bis(oxazoline), resulting in a total mixture weight of 1372 grams. After mixing, the combination of polymers was melt blended in a Leistritz ZSE-18 HP-PH twin screw extruder, with the temperature ramped from 280° C. to 320° C., and the compound was extruded into pellet form. The compounded polymer blend was melt extruded on a Brabender 1" single screw extruder through a flexible-lip film die to make a uniform (0.38 mm measure thickness) film.

[715F] Experiment 6: The following combination of polymers was weighed independently and then mixed together in a polyethylene bag: 150 grams of carboxylated functional FEP fluoropolymer, 975 grams of PFA, 195 grams of a thermoplastic polyimide (TPI), 39 grams of a functionalized polyetherimide with anhydride end groups, and 13 grams of bis(oxazoline), resulting in a total mixture weight of 1372 grams. After mixing, the combination of polymers was melt blended in a Leistritz ZSE-18 HP-PH twin screw extruder, with the temperature ramped from 280° C. to 320° C., and the compound was extruded into pellet form. The compounded polymer blend was melt extruded on a Brabender 1" single screw extruder through a flexible-lip film die to make a uniform (0.38 mm measure thickness) film.

[715G] Experiment 7: The following combination of polymers was weighed independently and then mixed together in a polyethylene bag: 150 grams of carboxylated functional FEP fluoropolymer, 975 grams of PFA, 195 grams of a thermoplastic polyimide (TPI), and 39 grams of a functional polyetherimide with amine end-groups, resulting in a total mixture weight of 1359 grams. After mixing, the combination of polymers was melt blended in a Leistritz ZSE-18 HP-PH twin screw extruder, with the temperature ramped from 280° C. to 320° C., and the compound was extruded into pellet form. The compounded polymer blend was melt extruded on a Brabender 1" single screw extruder through a flexible-lip film die to make a uniform (0.38 mm measure thickness) film.

Tables 18A and 18B below summarize the polymer blend ratios for Experiments 715A-715G. Table 18A shows the blend ratios as a weight percentage and Table 18B shows the blend ratios in grams.

strength was measured by ASTM D638 Standard Test Method for Tensile Properties of Plastics. The results of the tensile strength testing are shown in Table 19 below.

TABLE 20

Table 19: Results of Tensile Strength Testing

| Blend Formula | Max. Tensile Strength (MPa) | |
|---|---|---|
| | Average | Std Dev |
| Carboxylated FEP | 15.45 | 0.33 |
| PFA | 16.04 | 0.14 |
| 715A | 24.44 | 0.25 |
| 715B | 27.44 | 0.12 |
| 715C | 25.11 | 0.46 |
| 715D | 24.68 | 0.42 |
| 715E | 25.99 | 0.69 |
| 715F | 27.02 | 0.24 |
| 715G | 30.12 | 0.27 |

Figure 20:
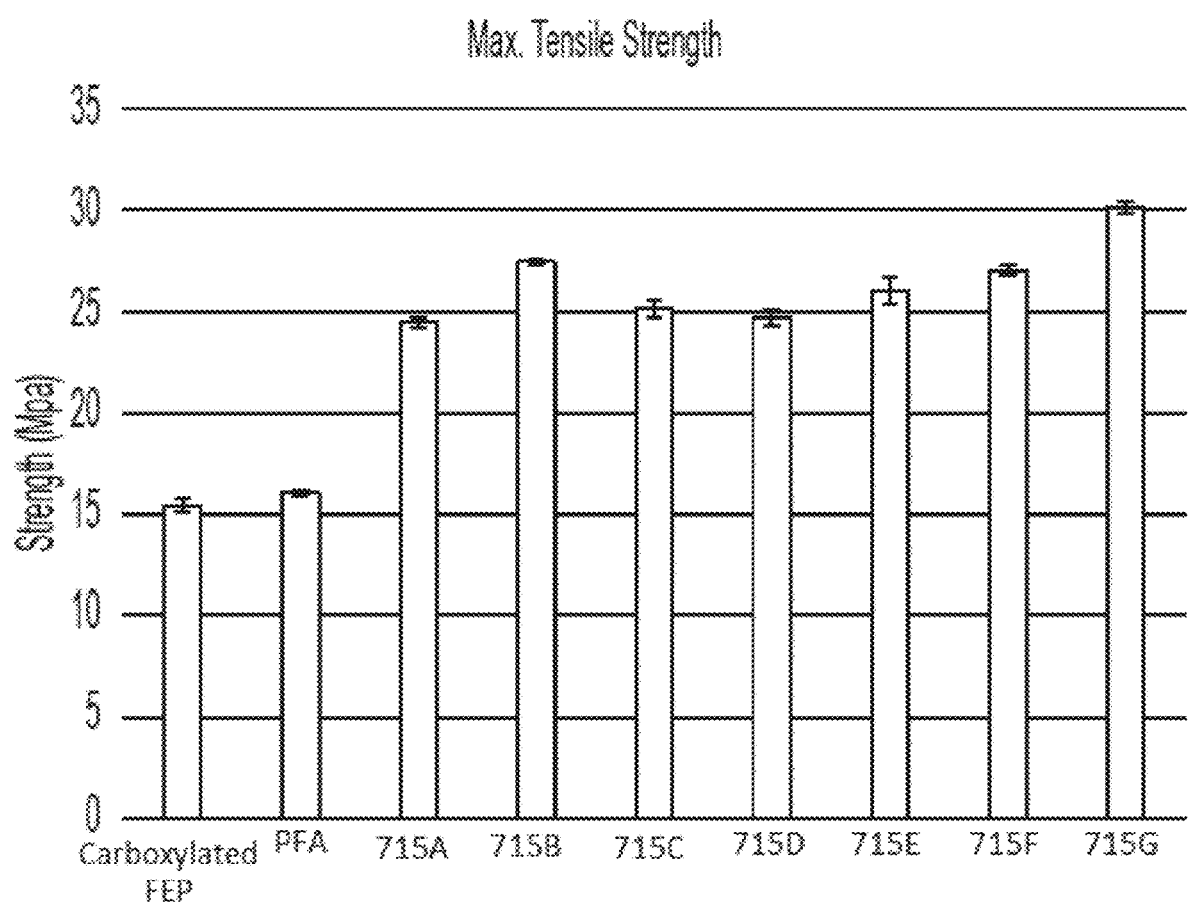
FIG. 20 is a bar graph showing the tensile strength of embodiments of the disclosed polymer blends formed as a thin film.

As shown in Table 19 and FIG. 20, the thin film of the FEP-PEI blend of Experiment 715G, which includes a polyetherimide with amine end-groups and no bis(oxazoline) compatibilizer, showed an increase in tensile strength over the carboxylated FEP, the PFA, and the other FEP-PEI blends.

TABLE 18A

Thin films of FEP-PEI blends (weight %)

| Experiment Number | PFA (%) | FEP with Carboxylated End-groups (%) | TPI (%) | PEI-COOH (%) | PEI-MAH (%) | PEI-AMINE | 1,4-Bis(4,5-dihydro-2-oxazolyl)benzene (%) |
|---|---|---|---|---|---|---|---|
| 715A | 75.00 | 10.00 | 15.00 | | | | |
| 715B | 75.00 | 10.00 | 15.00 | | | | 0.10 |
| 715C | 75.00 | 10.00 | 15.00 | | | | 1.00 |
| 715D | 75.00 | 10.00 | 15.00 | 3.00 | | | 0.10 |
| 715E | 75.00 | 10.00 | 15.00 | 3.00 | | | 1.00 |
| 715F | 75.00 | 10.00 | 15.00 | | 3.00 | | 1.00 |
| 715G | 75.00 | 10.00 | 15.00 | | | 3.00 | |

TABLE 18B

Thin films of FEP-PEI blends (g)

| Experiment Number | PFA (g) | FEP Carboxylated End-groups (g) | TPI (g) | PEI-COOH (g) | PEI-MAH (g) | PEI-AMINE | 1,4-Bis(4,5-dihydro-2-oxazolyl)benzene (g) | Total (g) |
|---|---|---|---|---|---|---|---|---|
| 715A | 975 | 150 | 195 | | | | | 1320 |
| 715B | 975 | 150 | 195 | | | | 1.3 | 1321 |
| 715C | 975 | 150 | 195 | | | | 13 | 1333 |
| 715D | 975 | 150 | 195 | 39 | | | 1.6 | 1360 |
| 715E | 975 | 150 | 195 | 39 | | | 13 | 1372 |
| 715F | 975 | 150 | 195 | | 39 | | 13 | 1372 |
| 715G | 975 | 150 | 195 | | | 39.00 | | 1359 |

Tensile Strength

The thin films of FEP-PEI blends shown in Tables 18A and 18B were tested for tensile strength. The sample film was punched with a Lucris MA Series 3 press with an ASTM D638 Type V tensile bar die. The sample film was loaded into an Instron Universal Testing Machine using pneumatic grips to hold the sample. The distance between grips was set to 25.4 mm. The sample was tested at a rate of 50 mm/min until failure of the sample by breaking occurred. The tensile Elongation at Break The thin films of FEP-PEI blends shown in Tables 18A and 18B were tested for elongation at break. The sample film was punched with a Lucris MA Series 3 press with an ASTM D638 Type V tensile bar die. The sample film was loaded into an Instron Universal Testing Machine using pneumatic grips to hold the sample. The distance between grips was set to 25.4 mm. The sample was tested at a rate of 50 mm/min until failure of the sample by breaking occurred. Elongation was measured by ASTM D638 Standard Test Method for Tensile Properties of Plastics. The results of the elongation testing are shown in Table 20 below.

TABLE 20

Results of Elongation Testing

| Blend | Elongation (%) | |
|---|---|---|
| Formula | Average | Std Dev |
| Carboxylated FEP | 265.40 | 19.86 |
| PFA | 228.23 | 23.52 |
| 715A | 34.60 | 5.58 |
| 715B | 25.30 | 4.29 |
| 715C | 10.93 | 0.65 |
| 715D | 12.75 | 0.45 |
| 715E | 11.65 | 0.76 |
| 715F | 10.45 | 0.61 |
| 715G | 22.95 | 0.45 |

Figure 21:
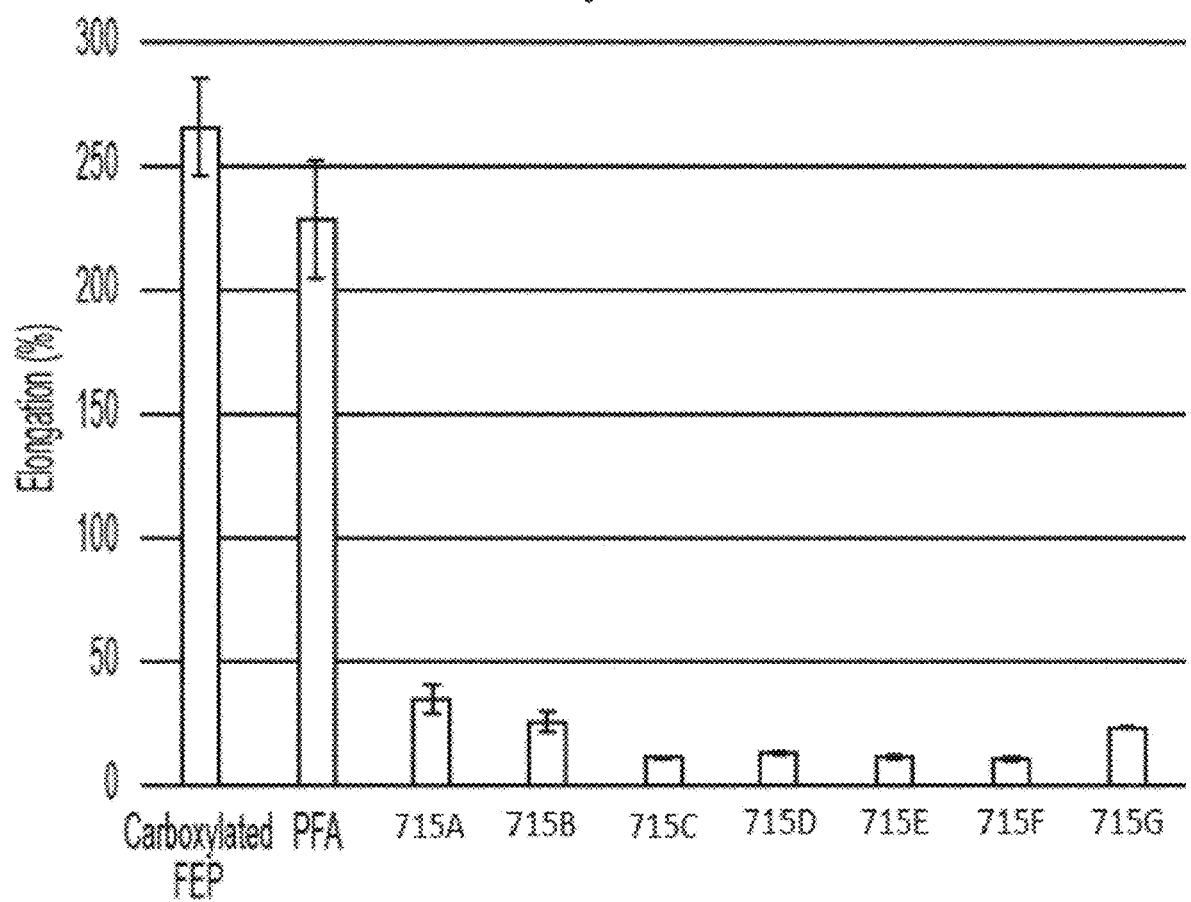
FIG. 21 is a bar graph showing the elongation at break of embodiments of the disclosed polymer blends formed as a thin film.

As shown in Table 20 and FIG. 21, the thin film of the FEP-PEI blend of Experiment 715G, which includes a polyetherimide with amine end-groups and no bis(oxazoline) compatibilizer, showed a significant decrease in elongation when compared to the carboxylated FEP and the PFA.

Young Modulus

The thin films of FEP-PEI blends shown in Tables 18A and 18B underwent modulus testing. The sample film was punched with a Lucris MA Series 3 press with an ASTM D638 Type V tensile bar die. The sample film was loaded into an Instron Universal Testing Machine using pneumatic grips to hold the sample. The distance between grips was set to 25.4 mm. The sample was tested at a rate of 50 mm/min until failure of the sample by breaking occurred. Modulus was measured by ASTM D638 Standard Test Method for Tensile Properties of Plastics. The results of the modulus testing are shown in Table 21 below.

TABLE 21

Results of Modulus Testing

| Blend | Young Modulus (MPa) | |
|---|---|---|
| Formula | Average | Std Dev |
| Carboxylated FEP | 247.32 | 12.02 |
| PFA | 237.45 | 14.27 |
| 715A | 390.94 | 47.72 |
| 715B | 433.36 | 29.24 |
| 715C | 431.54 | 54.93 |
| 715D | 453.47 | 38.79 |
| 715E | 473.18 | 36.46 |
| 715F | 496.16 | 39.76 |
| 715G | 486.74 | 12.42 |

Figure 22:
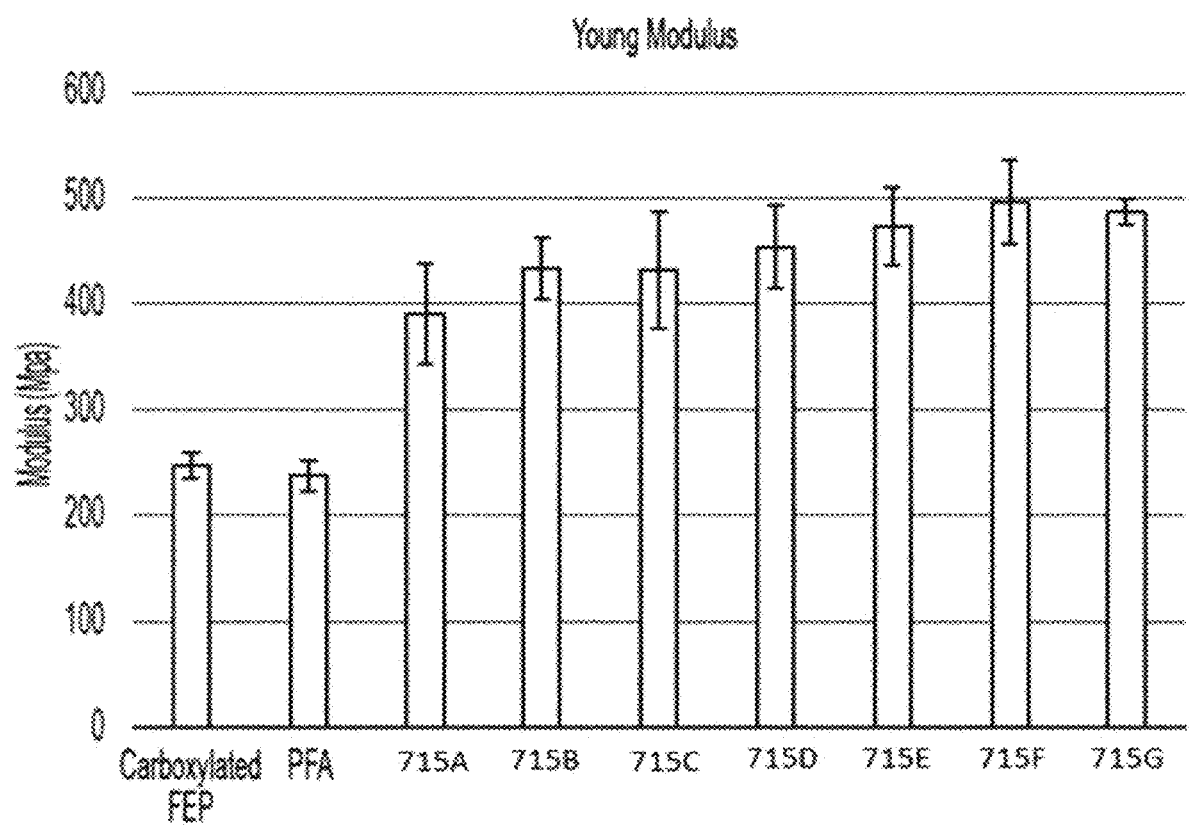
FIG. 22 is a bar graph showing the young modulus of embodiments of the disclosed polymer blends formed as a thin film.

As shown in Table 21 and FIG. 22, the thin film of the FEP-PEI blend of Experiment 715G, which includes a polyetherimide with amine end-groups and no bis(oxazoline) compatibilizer, showed a significant increase in modulus when compared to the carboxylated FEP and the PFA. The 715G blend also showed an increase in modulus when compared to the 715A-E blends.

Yield Strength

The thin films of FEP-PEI blends shown in Tables 18A and 18B were tested for yield strength. The sample film was punched with a Lucris MA Series 3 press with an ASTM D638 Type V tensile bar die. The sample film was loaded into an Instron Universal Testing Machine using pneumatic grips to hold the sample. The distance between grips was set to 25.4 mm. The sample was tested at a rate of 50 mm/min until failure of the sample by breaking occurred. Yield strength was measured by ASTM D638 Standard Test Method for Tensile Properties of Plastics. The results of the yield strength testing are shown in Table 22 below.

TABLE 22

Results of Yield Strength Testing

| Blend | Yield Strength (MPa) | |
|---|---|---|
| Formula | Average | Std Dev |
| Carboxylated FEP | 11.09 | 1.91 |
| PFA | 12.55 | 0.93 |
| 715A | 23.15 | 0.99 |
| 715B | 26.52 | 1.19 |
| 715C | 21.90 | 4.21 |
| 715D | 22.49 | 2.00 |
| 715E | 25.21 | 1.30 |
| 715F | 25.68 | 0.19 |
| 715G | 29.18 | 0.94 |

Figure 23:
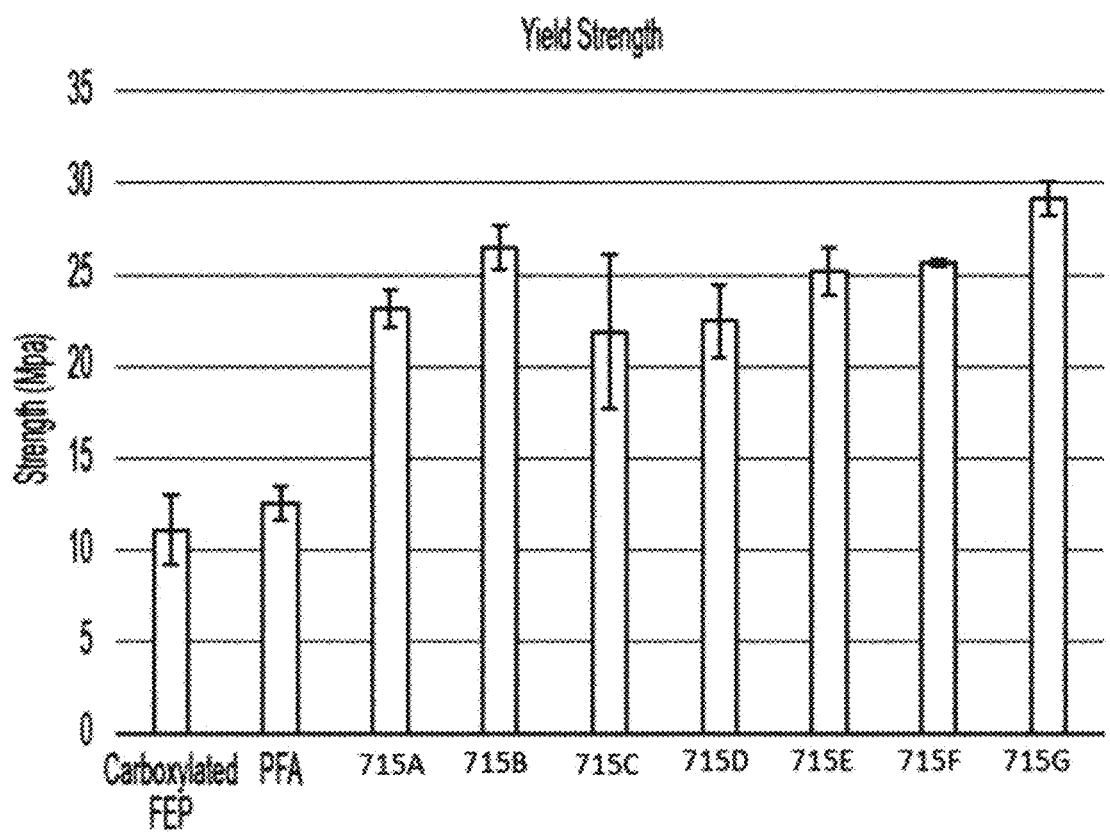
FIG. 23 is a bar graph showing the yield strength of embodiments of the disclosed polymer blends formed as a thin film.

As shown in Table 22 and FIG. 23, the thin film of the FEP-PEI blend of Experiment 715G, which includes a polyetherimide with amine end-groups and no bis(oxazoline) compatibilizer, showed a significant increase in yield strength when compared to the carboxylated FEP and the PFA. The 715G blend also showed an increase in yield strength when compared to the 715A-F blends.

Coefficient of Thermal Expansion

An injection molded sample plaque was taken and cut into a rectangular shape. The rectangular sides were marked to indicate flow, transverse, and thickness directions based on gate location. The rectangular size was about 5 mm, 4.5 mm by 2 mm. The sample was flat on each side. The sample holder for Thermomechanical Analysis equipment (TMA) was opened and the sample was placed into the holder on the side to be measured. The probe was lowered onto the sample and engaged with a force of 0.100 N. The sample chamber was closed and the temperature was equilibrated to 45° C. The sample chamber began to heat at a rate of 10° C./min up to a final temperature of 120° C., and then held isothermally for 5 minutes. For cycle 2, the temperature was decreased at a rate of 10° C./min to 55° C. For cycle 3, the temperature chamber was heated at 5° C./min up to 190° C. When testing was complete, the experimental data was exported to TA Universal Analysis software. In the plot, there was a line with two slopes. The co-efficient of thermal expansion (CTE) was taken before and after the onset temperature (glass transition temperature or the point where the slope changes). The CTE was taken as the slope of the line. This was repeated for each side to get the CTE in the flow direction (aligned polymer changes), the transverse (to the flow) direction (unaligned chains), and the thickness direction.

Table 23 below shows the CTE in the transverse (Z direction) for the tested blends.

TABLE 23

Coefficient of Thermal Expansion-
Transverse (Z direction)

| | CTE Z axis (PPM/° C.) | |
|---|---|---|
| Blend Formula | 80° C. | 100° C. |
| Carboxylated FEP | 184.2 | 206.9 |
| PFA | 184.6 | 204.3 |
| 715A | 159.8 | 177.2 |

TABLE 23-continued

Coefficient of Thermal Expansion-
Transverse (Z direction)

| Blend Formula | CTE Z axis (PPM/° C.) | |
|---|---|---|
| | 80° C. | 100° C. |
| 715B | 158.7 | 180.0 |
| 715C | 156.5 | 176.3 |
| 715D | | |
| 715E | | |
| 715F | 157.2 | 179.5 |
| 715G | 149.1 | 165.7 |
| TPI | 52.2 | 55.9 |

Table 24 below shows the CTE in the flow direction (X axis) for the tested blends.

TABLE 24

Coefficient of Thermal Expansion-
Flow Direction (X-axis)

| Blend Formula | CTE XY axis (PPM/° C.) | |
|---|---|---|
| | 80° C. | 100° C. |
| Carboxylated FEP | 175.2 | 192.7 |
| PEA | 149.7 | 167.8 |
| 715A | 95.2 | 99.4 |
| 715B | 84.8 | 86.0 |
| 715C | 89.8 | 90.3 |
| 715D | | |
| 715E | | |
| 715F | 78.3 | 89.6 |
| 715G | 102.8 | 104.4 |
| TPI | | |

Thermal Stability

The PFA fluoropolymer, the thermoplastic polyimide (TPI), and the 715G blend were tested for thermal stability. A sample of the polymer to be tested was cut and placed into a TGA pan. The weight of the sample should be about 10 mg to about 15 mg. The sample pan was placed into the TGA and the furnace was closed. For thermal stability protocol, the TGA furnace was purged with continuous flowing nitrogen gas at a rate of 10 ml/min. The TGA furnace program was set to heat from room temperature (15-30° C., but preferably 23° C.) up to 800° C. at a 10° C./min temperature ramp. The TGA recorded the weight of the sample over time as the sample was heated. When the heating cycle was complete, the pan with any remaining material was removed from the furnace. The 5% weight loss temperatures of each polymer are shown in Table 25 below.

TABLE 25

5% Weight Loss Temperatures
5% Weight Loss Temperature (° C.)

| TPI | 518.1 |
|---|---|
| PFA Fluoropolymer | 511.6 |
| 715G | 507.0 |

Figure 24:
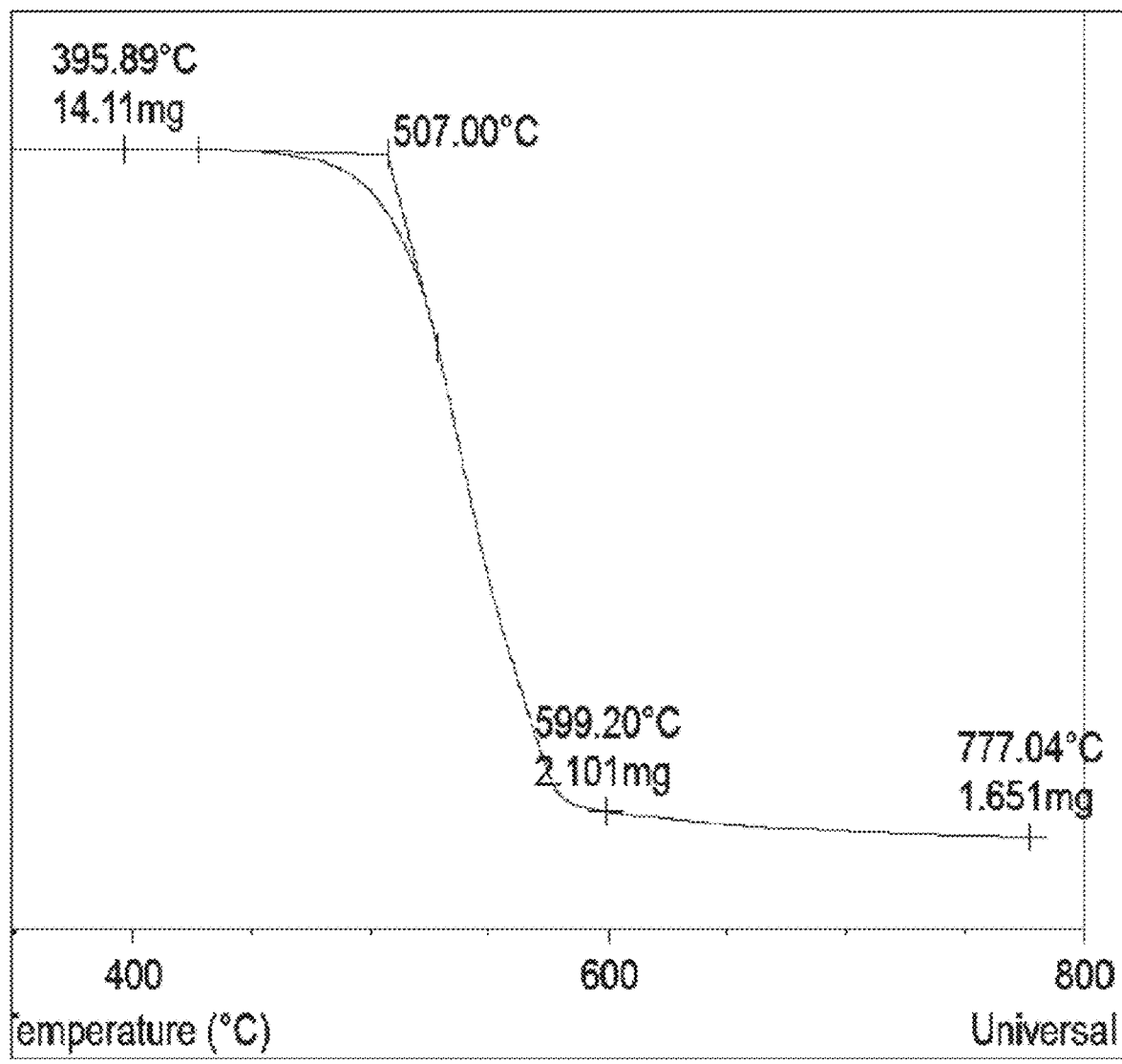
FIG. 24. Graph showing the thermal stability of an embodiment of the disclosed polymer blends, a PFA fluoropolymer, and a polyetherimide.

As shown in Table 25 and FIG. 24, the 715G blend shows a high thermal stability up to 507° C. and is comparable to the thermal stability of the PFA fluoropolymer and the thermoplastic polyimide (TPI).

Example 7: PEI/PFA Blends

Preparation of a PEI/PFA Reactive Polymer Compatibilizer

A reactive polymer compatibilizer is one type of compatibilizing agent. Reactive polymer compatibilizers may be formed by blending a functionalized fluoropolymer with one or more multi-functional molecules such as, monomers, oligomers, or polymers. The multi-functional molecule may include end groups such as, for example, diamines, di-anhydrides, dicarboxylic acids, di-epoxies, di-hydroxyl. It will be appreciated that the multi-functional molecules are not limited to di-functional species but may include tri and/or tetra functional molecules as well. In some embodiments, a reactive polymer compatibilizer may be formed by mixing a functionalized fluoropolymer, a diamine functionalized molecule, and a di-anhydride functionalized molecule. In some embodiments, the diamine and/or di-anhydride functionalized molecules are monomers. In some embodiments the reactive polymer compatibilizer may also include an amine-terminated molecule, such as, for example, a monomeric, oligomeric, or polymeric PEI-amine. In some embodiments, a reactive polymer compatibilizer may be formed by mixing a functionalized fluoropolymer and an amine-terminated molecule such as a polymeric PEI-amine.

In some embodiments, a reactive polymer compatibilizer may be formed by blending the various components together in a single step. In some embodiments, the components of a reactive polymer compatibilizer may be blended using an extruder.

In the current example, a reactive polymer compatibilizer may be made by blending perfluoroalkoxy alkane (PFA), and a sheared PFA with 4,4'-(Hexafluoroisopropylidene) diphthalic anhydride, PEI-Amine, and 4,4'-Oxydianiline until homogeneous. The percentage of each chemical is shown in Table 26. The sheared PFA is made by processing commercial PFA using a high shear extruder. Sheared PFA has about 3-5 times the number of reactive end groups as commercial, unsheared, PFA. 4,4'-(Hexafluoroisopropylidene)diphthalic anhydride and 4,4'-oxydianilie are both PEI monomers.

Once the samples were thoroughly mixed, the mixture was fed at 4.0 to 6.0 kg/hr into a Leistritz ZSE-18 HP-PH twin screw extruder and the compound was extruded into pellet form. Zones 1 through 8 were heated from 350 to 390° C. for sample 161A. The screw speed was kept constant at 250 rpm. The PEI/PFA reactive polymer compatibilizer blend can also be prepared with or without the presence of PFA. All reactive polymer compatibilizer blends were obtained as slight yellow pellets.

TABLE 26

Percentage of each chemicals utilized to
make reactive compatibilizer 161A.

| Sample # | Sheared PFA | 4,4'-(Hexafluoroiso-propylidene) diphthalic Anhydride | 4,4' Oxydianiline | PEI-Amine |
|---|---|---|---|---|
| 161A | 81.81% | 3.11% | 1.44% | 13.64% |

Preparation of a PEI/PFA Compatibilized Blend

Blend formulations for the compatibilization of PFA with PEI and TPI is shown in Table 27 (below). Reactive compatibilizer sample 161A, PEI or TPI, 1,4-Bis(4,5-dihydro-2-oxazolyl)benzene, nanoparticles and PFA were all added to one bag and mixed until homogeneous. As shown in Table 27, the nanoparticles, Silocym-A, were not utilized in sample 162F. The mixture was then fed at 2.0 to 6.0 kg/hr into a Leistritz ZSE-18 HP-PH twin screw extruder and the compound was extruded into pellet form. Zones 1 through 8 were heated from 350 to 390° C. Screw speed was keep constant at 250 rpm. PEI/PFA blends were obtained as slight yellow pellets.

Preparation of PEI/PFA Thin Films

All PEI/PFA films discussed in this Example 7 were produced on a Davis Standard 1" GP single screw extruder with a 9" FL-100 coat hanger die. Screw speed was between 20 to 40 rpms. Melt pressure was between 490 to 920 PSI. The temperatures from zone 1 to 4 were between 327 to 371° C. Thickness of the produced film was between 25 to 100 µm.

Preparation of PEI/PFA Fibers

All PEI/PEI fibers discussed in this example were produced on a Leistriz ZSE 27 HP twin screw extruder equipped with a 12 hole 0.8 mm block die. Screw speed was kept constant at 100 rpms. Melt pressure was between 325 to 500 PSI. Temperatures from zone 1 to 8 were between 325 to 380° C. The feed rate was held constant at 3.0 kg/hr. Fibers had diameters measuring from 0.09 mm to 0.2 mm.

Tensile Tests of Tensile Bars

All mechanical testing of the injected molded samples was carried out using ASTM D638 Type V tensile bars. All tensile tests were completed according to ASTM D638 using Type V tensile bars and an Instron machine model 3365. All samples were pulled at 10 mm/min until break. BlueHill 2 software was used to calculate Young's modulus (YM), tensile strength, and elongation. All data represents the average of testing four tensile bars.

Tensile Tests Fibers

Individual fibers were attached to paper mounts following ASTM D-3379-75 with a gauge length of 30 mm using tape. A secondary line of tape and a piece of paper were used to secure the fibers in place and to eliminate direct friction onto the fibers from the Instron grips. For each sample, the diameter of the fiber was measured using a Ziess Stereo Discovery V.12 microscope. The mechanical properties of the fluoropolymer and fluoropolymer alloy fibers were measured using an Instron 5582 Universal Tester. The Instron was equipped with 1 kN load cells and wedge action grips. Once each sample was loaded into the wedge action grips the fiber mounts were cut using scissors. Tensile measurements were carried out with an extension rate of 50 mm/min until break. Using the BlueHill 2 software the tensile strength, tensile modulus, and elongation were calculated. All values reported are an average of 15 samples.

Thermal Mechanical Analysis (TMA)

Coefficients of thermal expansion (CTE) were measured by a TA Instruments TMA Q400 using 200 to 300 µm samples cut from injection molded 3×3 cm plaques. Initial sample dimensions were measured using a Mitutoyo series 293 micrometer. All samples were run using the following method: 1: Balance the instrument to establish a force of less than 0.10 N; 2: Equilibrate the sample at 48.0° C.; 3: Mark the end of cycle 0; 4: Ramp the sample temperature at a rate of 10.0° C./min until the sample temperature reaches 100.0° C.; 5: Maintain the temperature of 100.0° C. for 5.00 min; 6: Mark the end of cycle 1; 7: Ramp the sample temperature at a rate of 10.0° C./min until the sample temperature reaches 55.0° C.; 8: Mark the end of cycle 2; 9: Ramp the sample temperature at a rate of 5.0° C./min until the sample temperature reaches 190.0° C.; 10: Mark the end of cycle 3; 11: Jump the sample temperature to 30.0° C.; 12: End of method.

CTE, α, was calculated using the following equation:

$$\alpha = (1/L_0)(\Delta L/\Delta T)$$

where $L_0$ represents the initial sample height at 25° C., $\Delta L$ represents the change in height in microns (µm), and $\Delta T$ represents the change in temperature in degrees Celsius (° C.). All samples were measured when the temperature had changed ($\Delta T$) by 5 degrees Celsius. All values reported are in the Z direction (thickness) of the injection molded sample unless otherwise stated.

Dynamic Mechanical Analysis (DMA) of Flexural Bars

Glass transition temperatures ($T_g$) and storage modulus (G') were measured by a TA Instruments DMA Q800 using 12.6×1.2 cm injection molded flexural bars. Mitutoyo Absolute model CD-6 micrometer were utilized to measure initial sample dimensions. All samples were run using the following method: 1: Data storage: off; 2: Equilibrate at 40.00° C.; 3: Isothermal for 1.00 min; 4: Data storage on; 5: Ramp 3.00° C./min to 270.00° C.; 6: End of method.

Data and Analysis

Figure 25:
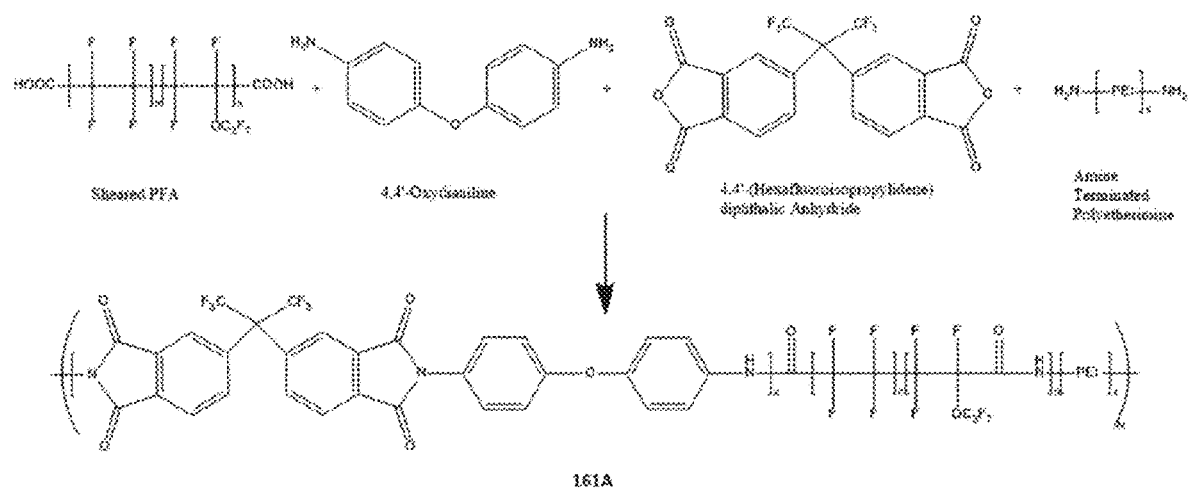
FIG. 25 is a diagram showing a potential synthesis of a reactive polymer compatibilizer according to one embodiment.

FIG. 25 shows a potential reaction for the preparation of a PEI/PFA reactive polymer compatibilizer blend by polycondensation in a Leistriz twin screw extruder. In this embodiment, the polycondensation is driven by the heat of the extruder and the HF produced by the sheared PFA serves as a Lewis acid driving the reaction. As shown in FIG. 25, a reactive polymer compatibilizer, such as, for example, sample 161A, may be prepared as a random block copolymer using 4,4-Oxydianiline, 4,4'-(Hexafluoroisopropylidene) diphthalic anhydride, and PEI-amine. In some embodiments, a reactive polymer compatibilizer is effective in lowering the interfacial tension between PFA and PEI or TPI. Monomers, 4,4'-Oxydianiline and 4,4'-(Hexafluoroisopropylidene) diphthalic anhydride serve as effective chain extenders for the larger polymers of sheared PFA and PEI-Amine. The corresponding block copolymers, monomers, and oligomers may be reacted to form imide and amide bonds leading to a new random block copolymer reactive polymer compatibilizer as shown in FIG. 25.

Table 27 shows compositions of samples 891J, 891L, and 162F. As previously discussed, reactive polymer compatibilizers, such as sample 161A, or other compatibilizing agents may be utilized to lower the surface tension between PEI or TPI with PFA. 1,4-Bis(4,5-dihydro-2-oxazolyl)benzene, a bis(oxazoline) compound, was used to react PEI and TPI to PFA. Reactive polymer compatibilizers, such as 161A, may further improve compatibility by increasing miscibility of PEI and TPI in PFA. Improved compatibility between the polymers can lead to improved processability.

TABLE 27

Formulations of compatibilized blends.

| Sample | 161A | TPI | PEI | PFA | 1,4-Bis(4,5-dihydro-2-oxazolyl)benzene | Nano particles |
|---|---|---|---|---|---|---|
| 891J | 12.5% | 12.5% | 0 | 74.5% | 0.15% | 0.35% |
| 891L | 12.5% | 12.5% | 0 | 74.7% | 0.15% | 0.15% |
| 162F | 10.0% | 0 | 7.5% | 82.25% | 0.25% | 0% |
| TPHA 1000B | 0 | 0 | 18% | 81% | 1% | 0% |

Samples 891J, 891L, and 162F showed improved processing characteristics relative to TPHA 1000B, a PEI/PFA blend without any reactive polymer compatibilizer. With the addition of the reactive polymer compatibilizer 161A, the feed rate was improved from 2.0 kg per hour for TPHA 1000B to a high of 6.0 kg per hour for 162F. Samples 891J and 891L were both processed at 4.5 kg per hour. Pellets produced from 891J, 891L, and 162F were more homogeneous and showed a considerable reduction in die swell compared to TPHA 1000B.

Table 28 shows the tensile data for 162F, 891J, 891L, TPHA-1000B and PFA using injection molded tensile bars at room temperature. The data shows an increase of max tensile strength from 19 for PFA to the highest of 31 for 891J. This is an increase of over 38 percent. When compared to sample TPHA-1000B, we also see a substantial increase of over 38 percent. Young's modulus improved with all of the other samples when compared to PFA. Only a marginal increase was observed for 891J and 891L when compared to TPHA-1000B. 162F showed a significant decrease from 479.4 MPa to 348.4 MPa when compared to TPHA-1000B. An unexpected result was the increase in elongation observed with the other samples. For example, 162F has an elongation of 218.5% and is very close to PFA with an elongation of 230.9%. The other samples show a very significant increase in elongation when compared to the sample TPHA-1000B.

TABLE 28

Tensile data for 162F, 891J, 891L, TPHA-1000B and PFA.

| Sample | Max Tensile (MPa) | Young's Modulus (MPa) | Elongation (%) |
|---|---|---|---|
| 162F | 26.23 | 348.4 | 218.5 |
| 891J | 31 | 509.2 | 51.9 |
| 891L | 30.5 | 518.4 | 47 |
| TPHA-1000B | 18.8 | 479.4 | 7.8 |
| PFA | 19 | 301 | 230.9 |

Table 29 displays the coefficient of thermal expansion (CTE) of 162F, 891J, 891L, TPHA-1000B, and PFA in the Z-direction (thickness) as a function of temperature. 162F has a much lower CTE compared to TPHA-1000B at all temperatures. Samples 891J and 891L had a lower CTE relative to TPHA-1000B at temperatures from 120 to 180° C. All samples had a lower CTE relative to PFA at 120, 150, and 180° C. Only 162F consistently has lower CTE values at 80 and 100° C.
[Table 30]

TABLE 29

Coefficient of thermal expansion (CTE) in the Z-direction.

| Sample | CTE @ 80° C. (μm/m-C) | CTE @ 100° C. (μm/m-C) | CTE @ 120° C. (μm/m-C) | CTE @ 150° C. (μm/m-C) | CTE @ 180° C. (μm/m-C) |
|---|---|---|---|---|---|
| 162F | 57.4 | 121.4 | 127.5 | 137.8 | 210.4 |
| 891J | 130.8 | 142.7 | 90.6 | 114.9 | 157.7 |
| 891L | 128.9 | 141.4 | 65.4 | 100.6 | 152.8 |
| TPHA-1000B | 81.8 | 152.6 | 157.3 | 164.5 | 185.3 |
| PFA | 74.1 | 150 | 192.7 | 216.6 | 260.3 |

Table 30 shows the storage modulus of POLY-162F, POLY-0891J, POLY-0891L, TPHA-1000B, and PFA at 100 and 150° C. All samples in Table 29 were injection molded under the same conditions as each other. Samples 162F, 891J, and 891L all show a higher storage modulus than PFA. In particular, sample 891L had a storage modulus of 321.7 MPa at 100° C. This is about triple the storage modulus of the control PFA with a value of 107.2 MPa at 100° C. The sample, TPHA-1000B, had the lowest storage modulus with a value of 69.8 MPa at 100° C. and 41.6 MPa at 150° C.

TABLE 30

Storage Modulus by dynamic mechanical analysis (DMA).

| Sample | Storage Modulus @ 100° C. (MPa) | Storage Modulus @ 150° C. (MPa) |
|---|---|---|
| 162F | 262.5 | 183.2 |
| 891J | 290.7 | 215.5 |
| 891L | 321.7 | 231.6 |
| TPHA-1000B | 69.8 | 41.6 |
| PFA | 107.2 | 61.2 |

Storage modulus is a measure of elastic response of a material in-phase. A higher storage modulus induces a higher ability of the material to store deformation energy.

Table 32 shows the dissipation factor ($D_f$) and dielectric constant ($D_k$) of PFA, 891J, and 891L at about 16.9 GHz. The materials were tested in the form of about 2 mm thick plaques using a split cavity resonator. Each sample was tested twice as indicated by the Sample ID. As expected, PFA has the lowest $D_k$ and $D_f$ compared to the other materials.

TABLE 32

Dissipation factor ($D_f$) and dielectric constant ($D_k$)

| SAMPLE ID | Thickness (mm) | Frequency (GHZ) | Dielectric Constant ($D_k$) | Dissipation Factor ($D_f$) |
|---|---|---|---|---|
| 891J-1 | 1.998 | 16.904 | 2.29 | 0.004405 |
| 891J-2 | 1.993 | 16.917 | 2.29 | 0.004397 |
| 891L-1 | 2.005 | 16.911 | 2.28 | 0.004315 |
| 891L-2 | 1.998 | 16.92 | 2.28 | 0.004326 |
| PFA-1 | 2.015 | 16.80 | 2.053 | 0.00104 |
| PFA-2 | 2.008 | 16.84 | 2.052 | 0.00010 |

Table 33 displays the mechanical properties of fibers produced from 162F, 891J, 891L, TPHA-1000B, and PFA at room temperature. 891L, which includes the reactive polymer compatibilizer 161A, has the highest max tensile strength at 68.8 MPa.

TABLE 33

Mechanics properties of fibers.

| Sample | Max Tensile (MPa) | Young's Modulus (MPa) | Elongation (%) |
|---|---|---|---|
| 162F | 51.2 | 1152.1 | 714.3 |
| 891J | 67.3 | 1462.9 | 102.3 |
| 891L | 68.8 | 1340.3 | 154.1 |
| TPHA-1000B | 40.2 | 1120.6 | 172.3 |
| PFA | 36.6 | 450.8 | 489.8 |

Various blends of polymer alloys are disclosed herein. In some embodiments, a polymer alloy comprise a fluoropolymer, a compatibilizing agent, and a non-fluoropolymer. In some embodiments, the fluoropolymer may be fully or partially fluorinated. The non-fluoropolymer may include any non-fluorinated polymer such as, for example, olyether imide (PEI) polyimide (PI), nylon (multiple types), Liquid Crystal Polymers (LCP), Polyesters, Thermoplastic Urethanes (TPU), Cyclic Polyolefins copolymers (COC), Thermoplastic Polyimides (TPI), Acrylonitirile Butediene Styrene (ABS), High impact polystyrene (HIPS), Polycarbonate (PC), Polyethylene terephalate (PET), Poly-ether-ether Ketone (PEEK), Poly Aryl ether ketone (PAEK), poly sulfone (PSU), Poly amide imide (PAI), Polyphenlyene sulfone (PPSU), Polyarylate (PAR), Polybutylene Terephthalate (PBT), Polyethylene naphthalate (PEN), and/or polyphenylene oxide (PPO). In some embodiments, the fluoropolymer is perfluoroalkoxy alkane (PFA) or fluorinated ethylene propylene (FEP).

In some embodiments, the compatibilizing agent may be a reactive polymer compatibilizer and/or a bis(oxazoline) compound. In some embodiments, the polymer alloy comprises both a reactive polymer compatibilizer and a bis (oxazoline) compound.

In some embodiments, the polymer alloy comprises a melt-processable polyimide such as a thermoplastic polyimide (TPI). In some embodiments, the polymer alloy comprises nanoparticles.

In some embodiments, a polymer alloy comprises at least about 50%, 55%, 65%, 70%, 75%, 80%, 85%, or 90% PFA or other fluoropolymer. In some embodiments, a polymer alloy comprises at most about 55%, 65%, 70%, 75%, 80%, 85%, 90%, or 95% PFA or other fluoropolymer.

In some embodiments, a polymer alloy comprises about 0.1%, 0.5%, 1%, 2%, 3%, 4%, 5%, 10%, 15%, 20%, 25%, 30%, 35%, 40%, 45%, 50%, 55%, 60%, 65%, 70%, 75%, 80%, 85%, 90%, 95%, 98%, or 99% reactive polymer compatibilizer.

In some embodiments, a polymer alloy comprises at least about 0.1%, 0.5%, 1%, 3%, 5%, 10%, 15%, or 20% non-fluorinated polymer such as PEI or PI. In some embodiments, a polymer alloy comprises at most about 1%, 3%, 5%, 10%, 15%, 20%, or 25% non-fluorinated polymer such as PEI or PI.

In some embodiments, a polymer alloy comprises at least about 0.1%, 0.5%, 1%, 3%, 5%, or 10% of a bis(oxazoline) compounds. In some embodiments, a polymer alloy comprises at most about 0.3%, 0.5%, 1%, 3%, 5%, 10% or 25% of a bis(oxazoline) compound.

In some embodiments, a reactive polymer compatibilizer comprises at least about 50%, 55%, 65%, 70%, 75%, 80%, 85%, or 90% sheared PFA or other sheared fluoropolymer. In some embodiments, a reactive polymer compatibilizer comprises at most about 55%, 65%, 70%, 75%, 80%, 85%, 90%, or 95% sheared PFA or other sheared fluoropolymer. In some embodiments, the sheared PFA or other sheared fluoropolymer are mechanically sheared.

In some embodiments, a reactive polymer compatibilizer comprises at least about 0.1%, 0.3%, 0.5%, 1%, 3%, or 5% of a di-anhydride. In some embodiments, a reactive polymer compatibilizer comprises at most about 0.3%, 0.5%, 1%, 3%, 5% or 10% of a di-anhydride.

In some embodiments, a reactive polymer compatibilizer comprises at least about 0.1%, 0.3%, 0.5%, 1%, or 3% of a diamine. In some embodiments, a reactive polymer compatibilizer comprises at most about 0.3%, 0.5%, 1%, 3%, 5% or 10% of a diamine.

In some embodiments, a reactive polymer compatibilizer comprises at least about 1%, 3%, 5%, 10%, 15%, or 20% of an amine terminated polymer such as PEI-amine. In some embodiments, a reactive polymer compatibilizer comprises at most about 3%, 5%, 10%, 15%, 20% or 25% of an amine terminated polymer such as PEI-amine.

CONCLUSIONS

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

What is claimed is:

1. A polymer alloy composition comprising:
   between about 70-80% perfluoroalkoxy alkane (PFA),
   between about 10-20% reactive polymer compatibilizer,
   between about 10-15% polyimide (PI),
   between about 0.1-0.3% bis(oxazoline), and
   between about 0.1-0.4% nanoparticles.

2. The polymer alloy composition of claim 1, wherein the bis(oxazoline) compound is 1,4-Bis(4,5-dihydro-2-oxazolyl)benzene.

3. The polymer alloy composition of claim 1, wherein the polyimide is a melt-processable thermoplastic polyimide (TPI).

4. The polymer alloy composition of claim 1, further comprising nanoparticles.

5. The polymer alloy composition of claim 1, wherein the reactive polymer compatibilizer comprises sheared PFA, 4,4'-(Hexafluoroisopropylidene)diphthalic Anhydride, 4,4'-Oxydianiline, and PEI-Amine.

6. The polymer alloy composition of claim 1, wherein the reactive polymer compatibilizer comprises between about 75-85% sheared PFA, between about 2.5-3.5% 4,4'-(Hexafluoroisopropylidene)diphthalic anhydride, between 1.2-1.7% 4,4'-Oxydianiline, and between 10-15% PEI-Amine.

7. The polymer alloy composition of claim 1, wherein the polymer alloy composition has a maximum tensile strength of between about 20 and 35 MPa.

8. The polymer alloy composition of claim 1, wherein the polymer alloy composition has a coefficient of thermal expansion in the Z-direction of between about 115 and 145 (μm/m-C) at about 100° C.

9. The polymer alloy composition of claim 1, wherein the polymer alloy composition has a coefficient of thermal expansion in the Z-direction of less than about 150 (μm/m-C) at about 150° C.

10. The polymer alloy composition of claim 1, wherein the polymer alloy composition has a storage modulus of between about 200-350 MPa at about 100° C.

11. The polymer alloy composition of claim 1, wherein the polymer alloy composition has a storage modulus of between about 150-250 MPa at about 150° C.

* * * * *